(12) United States Patent
Spada et al.

(10) Patent No.: US 6,293,037 B1
(45) Date of Patent: Sep. 25, 2001

(54) PRESSURE-SENSITIVE ADHESIVES AND SELF-ADHESIVE POSTAGE STAMPS MADE THEREWITH

(75) Inventors: Lon T. Spada, Walnut; Carol A. Koch, San Gabriel, both of CA (US); Kathleen M. Alpaugh, Concord Township, OH (US)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 09/319,295

(22) PCT Filed: Dec. 4, 1997

(86) PCT No.: PCT/US97/23137

§ 371 Date: Sep. 22, 1999

§ 102(e) Date: Sep. 22, 1999

(87) PCT Pub. No.: WO98/24825

PCT Pub. Date: Jun. 11, 1998

Related U.S. Application Data

(63) Continuation-in-part of application No. 08/760,375, filed on Dec. 4, 1996, now Pat. No. 5,817,426.

(51) Int. Cl.⁷ ........................................ G09F 3/10
(52) U.S. Cl. ................ 40/638; 428/483; 428/511; 428/517
(58) Field of Search ................ 40/638; 428/483, 428/511, 517; 526/282

(56) References Cited

U.S. PATENT DOCUMENTS

| H509 | 8/1988 | Chao ........................ 526/264 |
| 4,243,500 | 1/1981 | Glennon ................ 204/159.12 |
| 4,311,759 | 1/1982 | Glennon ..................... 428/345 |
| 4,912,169 | 3/1990 | Whitmire et al. ............ 525/221 |
| 5,164,444 | 11/1992 | Bernard ..................... 524/833 |
| 5,187,235 | 2/1993 | Bordoloi et al. .............. 525/305 |
| 5,260,882 | 11/1993 | Blanco et al. ................ 525/305 |
| 5,434,213 | 7/1995 | Chen et al. ................. 524/533 |
| 5,602,221 | 2/1997 | Bennett et al. ............. 526/307.7 |
| 5,683,798 | 11/1997 | Bennett et al. . |
| 5,817,426 | * 10/1998 | Spada et al. ................. 428/483 |

FOREIGN PATENT DOCUMENTS

| 0 339 522A2 | 4/1989 | (EP) . |
| WO9 513328 | 5/1995 | (WO) . |
| WO9 513331 | 5/1995 | (WO) . |
| WO9 616134 | 5/1996 | (WO) . |

OTHER PUBLICATIONS

Japan, JP59226076A, Dec. 1984, Abstract.
Japan, JP61223076A, Oct. 1986, Abstract.
Japan, JP5310810A, Nov. 1993, Abstract.
Japan, JP1315409A, Dec. 1989, Abstract.
Database WPI Derwent Publications Ltd., London, GB, AN 94–189178, XP002060741. (1994).
Database WPI Derwent Publications Ltd., London, GB, AN 80–72530c, XP002060742. (1980).
Stueben, Kenneth C., *Ultraviolet Cured Pressure—Sensitive Adhesive*, Adhesive Chemistry Developments and Trends, 1984, pp. 319–350.

* cited by examiner

*Primary Examiner*—Robert Dawson
*Assistant Examiner*—D. Aylward
(74) *Attorney, Agent, or Firm*—Christie, Parker & Hale, LLP

(57) ABSTRACT

Acrylic, self-adhesive postage stamps are provided and include a flexible facestock bearing an acrylic pressure-sensitive adhesive (PSA), protected by a release liner. The acrylic PSA is a tackified or inherently tacky polymer formed from a plurality of monomers comprising, based on the total weight of monomeric composition, essentially of (i) 9 to 40% isobornyl acrylate and (ii) 50 to 91% of one or more alkyl acrylates.

16 Claims, No Drawings

PRESSURE-SENSITIVE ADHESIVES AND SELF-ADHESIVE POSTAGE STAMPS MADE THEREWITH

CROSS-REFERENCE TO RELATED APPLICATION

This is a continuation-in-part of U.S. patent application Ser. No. 08/760,375, filed Dec. 4, 1996; U.S. Pat. No. 5,817,426 which is incorporated herein by this reference.

FIELD OF THE INVENTION

This invention relates to unique pressure sensitive adhesives and self-adhesive postage stamps made with these adhesives.

BACKGROUND OF THE INVENTION

Pressure-sensitive adhesives (PSAs) are now widely used in many consumer products, including labels, tapes, and similar constructions. Both acrylic and rubber-based PSAs are known. Many PSAs adhere well to only certain types of substrates and do not adhere or perform well when applied to other substrates. For example, Kraton® rubber-based hot-melt PSAs adhere extremely well to low-energy surfaces like polyolefins, but do not adhere as well to paper or corrugated board. Many acrylic-based PSAs exhibit good adhesion to paper, but do not adhere well to low-energy, non-polar surfaces. Although a tackifier can be added to acrylic adhesives to improve their adhesion to non-polar substrates, often this results in a lowering of shear, convertibility, and other performance characteristics.

As PSAs continue to be used in a growing number of applications, a need has emerged for a truly "broad spectrum" PSA that performs well on a variety of surfaces and substrates. Such an adhesive would be useful in both the prime label business (e.g., labels for consumer products—bottles, cans, etc.) and the information processing (IP) business (e.g., EDP, laser printer labels, price marking labels, inventory labels, etc.). A broad spectrum PSA would also be useful in self-adhesive postage stamps and in other applications.

Since their introduction a few years ago, self-adhesive postage stamps have enjoyed tremendous popularity. In a typical construction, a sheetlet of self-adhesive postage stamps includes a laminate of an array of postage stamps made of a die-cut face stock, printed on one side with postage indicia, adhered to a release liner by a pressure-sensitive adhesive (PSA). U.S. Pat. No. 5,296,279 (Birnbaum et al.), assigned to Avery Dennison Corporation, is representative. ATM-dispensable, self-adhesive postage stamps are also known, and are disclosed in U.S. Pat. No. 5,503,436 (Alpaugh et al.), also assigned to Avery Dennison Corporation. Both patents are incorporated herein by reference.

The United States Postal Service (USPS) sets standards for United States-issued postage stamps. Government specification USPS-P-1238C (Jan. 24, 1996), which is attached hereto as Appendix 1 and incorporated by reference herein, identifies and describes certain "required," "target," and to-be-"monitored" properties of face stocks, adhesive layers (PSAs) and release liner backings (as well as linerless release coatings) to be used in self-adhesive postage stamps.

An important property of self-adhesive postage stamps is the ability to form a permanent adhesive bond, after a short dwell time, to a variety of substrates, including woven paper, regular Kraft, corrugated board, polyethylene based envelope stock (e.g., Tyvek®, sold by DuPont de Nemours, E.I., Co. of Wilmington Del.), and other materials commonly used in envelopes and parcels. To deter theft and re-use of stamps, it is desirable that the adhesive leave a telltale fiber tear mark on the paper envelope or package if attempts are made to remove the stamp.

SUMMARY OF THE INVENTION

According to the present invention, there are provided pressure-sensitive adhesives that exhibit excellent adhesion to a variety of surfaces, including paper; non-polar, low-energy surfaces such as polyethylene; and difficult-to-bond-to surfaces such as corrugated board. In one embodiment, the inherently tacky PSA comprises an acrylic emulsion polymer formed from (a) a plurality of monomers, comprising, based on the total weight of monomers, (i) about 9 to 40 percent by weight of an ethylenically unsaturated monomer containing an isobornyl group, such as isobornyl acrylate, and (ii) about 50 to 91 percent by weight of one or more alkyl acrylates, the alkyl group of each alkyl acrylate having about 4 to 8 carbon atoms; (b) at least one emulsifier; and (c) at least one polymerization initiator. Minor amounts of additional monomers may also be included in the monomer mixture. Alternatively, the polymer is prepared by bulk or by solvent polymerization.

When dried and laminated to a facestock, such as paper or a polymeric material, the polymers exhibit pressure-sensitive adhesive behavior and adhere well to paper, corrugated board, and low-energy surfaces. In particular, when applied to a low-energy surface, such as polyethylene, adhesive constructions prepared in accordance with the present invention exhibit 180° peel adhesion to polyethylene of at least 3.5 N/in—preferably at least 5.0 N/in; more preferably at least 8.0 N/in. When applied to a corrugated board substrate, the adhesive constructions exhibit a corrugated fiber tear of at least about 90%—more preferably at least about 95%. The adhesives are useful for a variety of label applications, including self-adhesive postage stamps and other PSA constructions.

In one embodiment, the PSAs are made by forming a synthetic latex by emulsion polymerization of the plurality of monomers, in the presence of at least one emulsifier and at least one polymerization initiator. Preferably, the initiators are added to the reaction mixture in a stepped, or ramped feed, beginning slowly and then doubling the rate of addition. In another embodiment, an acrylic PSA is made by solvent polymerization using, for example, ethyl acetate or any suitable organic solvent. In still another embodiment, a PSA is made by bulk polymerization.

The present invention also provides self-adhesive postage stamps made With these unique PSAs. Postage stamp constructions are conveniently prepared by coating or otherwise applying the PSA to a protective release liner and laminating the coated release liner to a suitable face stock having opposed first and second faces, at least one of which is imprinted with—or imprintable with—postage indicia. Alternatively, the PSA is applied directly to a face stock and then protected with a release liner. When applied to an envelope substrate, such as a woven paper substrate, the self-adhesive postage stamp constructions leave a fiber tear mark on the envelope even after only very short dwell times (as little as 5 minutes or less).

DETAILED DESCRIPTION

The present invention provides pressure-sensitive adhesives (PSAs) that exhibit good adhesion to a variety of substrates, including paper, corrugated board, and low-energy surfaces, such as polyethylene. In one embodiment, a PSA comprises an inherently tacky polymer formed by emulsion polymerization of (a) a plurality of monomers comprising, based on the total weight of monomers, (i) about 9 to 40 percent by weight of isobornyl acrylate and (ii) about 50 to 91 percent by weight of one or more alkyl acrylates, the alkyl group of each alkyl acrylate having about 4 to 8 carbon atoms; (b) at least one emulsifier; and (c) at least one polymerization initiator. In an alternative embodiment, an inherently tacky polymer is formed by solvent (solution) polymerization, using an organic solvent (for example, ethyl acetate) and no emulsifier. In another embodiment, an adhesive polymer is made by bulk polymerization.

Isobornyl acrylate (IBOA) is a high boiling, low odor, low toxicity, ethylenically unsaturated monomer containing an isobornyl group, a large ($C_{10}H_{17}$) cycloalkyl group that is believed to have a profound effect on the adhesive and rheologic properties of the resulting PSA. IBOA forms a homopolymer having a high glass transition temperature ($T_g$=94° C.). Preferred PSAs are made using between about 20 and 30% by weight of IBOA, based on the total weight of monomers.

Useful alkyl acrylates having from 4 to 8 carbon atoms in the alkyl group include, but are not limited to, butyl acrylate (BA), ethylhexyl acrylate (EHA), and isooctyl acrylate (IOA).

Preferably, the plurality of monomers further comprises a minor amount of one or more additional monomers, the presence of which yields a PSA having improved adhesive, processing, and/or converting properties. Nonlimiting examples include polar monomers, such as acrylic acid (AA), methacrylic acid (MAA), beta-carboxyethyl acrylate (BCEA), acrylamides and methacrylamides; short chain alkyl acrylates and methacrylates having alkyl groups with up to three carbon atoms; and monohydric alkyl acrylates and methacrylates having alkyl groups with about 2 to 8 carbon atoms. Preferably, the one or more additional monomers are present in a total amount of from about 0.5 to no more than about 20 percent by weight, based on the total weight of all monomers.

Useful short chain alkyl acrylates and methacrylates include, without limitation, methyl, ethyl, and propyl acrylate and methacrylate, with methyl methacrylate (MMA) being preferred. Nonlimiting examples of monohydric alkyl acrylates and methacrylates include, without limitation, 2-hydroxy ethyl acrylate (2-HEA), hydroxy ethyl methacrylate, hydroxy propyl acrylate, and hydroxy propyl methacrylate.

In one embodiment of the invention, an inherently tacky, acrylic PSA is prepared by emulsion polymerization of a mixture of monomers comprising, based on the total weight of monomers, from about 9 to about 40 percent IBOA; from about 50 to about 80 percent of an alkyl acrylate with 4 to 8 carbon atoms in the alkyl group, for example, EHA; from about 1 to about 20 percent MMA; from about 1 to about 6 percent AA; and from about 0.5 to about 6 percent 2-HEA; in the presence of at least one polymerization initiator and one emulsifier.

A particularly preferred pressure-sensitive adhesive is made by emulsion polymerization of a mixture of monomers that comprises, based on the total weight of monomers, about 26 percent IBOA, about 66 percent EHA, about 3 percent MMA, about 3 percent AA, and about 2 percent 2-HEA.

Preferably, the polymerization is controlled (through selection and amount of monomers, chain transfer agents, etc.) so that the overall gel content of the resulting polymer is between about 20 and 70%, with 35–50% being most preferred. Gel content represents the amount of polymer that is insoluble in tetrahydrofuran (THF), expressed as a percent by weight. Gel content can be determined by the gel partitioning method described in U.S. Pat. No. 5,164,444 (Bernard), which is incorporated by reference herein. In general, for the polymers of the present invention, a lower gel content leads to improved adhesion to low-energy surfaces.

The inherently tacky acrylic polymers of the present invention are prepared by free-radical emulsion polymerization in an oxygen-free atmosphere, in the presence of suitable polymerization initiators and emulsifiers (surfactants). Alternatively, solvent polymerization is employed. Preferably, one or more activators and chain transfer agents (or other molecular weight regulators) are also employed in the reaction.

Suitable polymerization initiators include, but are not limited to, persulfates, such as sodium persulfate ($Na_2S_2O_8$), potassium persulfate, peroxy persulfates; and peroxides, such as tert-butyl hydroperoxide (t-BHP); used alone or in combination with one or more reducing components or activators, such as bisulfites, metabisulfites, ascorbic acid, erythorbic acid, sodium formaldehyde sulfoxylate, ferrous sulfate, ferrous ammonium sulfate, etc. The activator is believed to form a redox couple with the initiator, and promotes faster generation of free radicals.

Enough initiator is used to promote free-radical polymerization of the monomers. Preferably, a small amount of base, e.g., ammonium hydroxide, sodium hydroxide, sodium bicarbonate, etc., is added to the initiator. The base appears to stabilize the emulsion polymerization.

Preferred emulsifiers include both anionic and nonionic surfactants and stabilizers, including without limitation, alkylphenol ethoxylates, such as nonylphenol ethoxylate (a nonionic surfactant sold as POLYSTEP F9 by Stepan Company Inc. of Winnetka, Ill.), alkylaryl sulfonates, such as sodium dodecylbenzene sulfonate (an anionic surfactant sold as Rhodacal DS10 by Rhone-Poulenc, of Cranbury, N.J.), and Rhodacal A246L (an alpha olefin sulfonate available from Rhone-Poulenc). The emulsifiers are employed in an amount sufficient to form stable monomer emulsions.

It is also preferred to employ a chain transfer agent or other molecular weight regulator to control average polymer chain length, crosslinking, and other properties of the acrylic copolymer. Nonlimiting examples include n-dodecyl mercaptan (n-DDM), t-dodecyl mercaptan (t-DDM), monothioglycerol, mercapto acetates, and long chain alcohols.

Generally, emulsion polymerization is carried out by making a pre-emulsion of monomers; charging a reactor, which is heated and purged with nitrogen; continually feeding an emulsified mixture of monomers to the reactor; and adding the initiator to the reactor in a stepped or ramped feed. Preferably, the initiator is introduced slowly at first, and then more quickly as the reaction proceeds. By adding the initiator (or initiator+base) in a stepped or ramped feed, polymerization proceeds in stages, with the initial polymers formed having a low gel content and a high molecular weight non-gel fraction, while the polymers formed at subsequent stages of the reaction tend to have a somewhat higher gel content and a lower molecular weight soluble fraction. Overall number average molecular weights ($M_n$) of the polymers' soluble fractions tend to lie within the range of about 15,000 to about 50,000. Weight average molecular weights ($M_w$) tend to range from about 130,000 to about 400,000.

The following are representative, nonlimiting examples of the invention.

EXAMPLE 1

The identity and amounts of monomers, initiators, surfactants, and other reaction components are set forth below in Tables 1A (Pre-Emulsion), 1B (Initial Reactor Charge), IC (Initiator Solution) and ID (Free Monomer Reduction).

A preemulsion was formed by adding a mixture of monomers (EHA, IBOA, MMA, AA, and HEA) to a pre-mixed aqueous solution of surfactants and stirring until stabilized. A reactor, equipped with a stirrer, heat source and nitrogen inlet, was charged with an aqueous solution of surfactants, an activator, and a chain transfer agent, under a stream of nitrogen.

The nitrogen purged reactor was heated to about 70° C., and a first charge (30 g) of the preemulsion was added to the reactor, which was then heated to 80° C. When the temperature reached 80° C., a small quantity of a polymerization initiator (0.06 g in 2 ml water) was added to the reactor, and an exothermic polymerization reaction commenced.

At the peak of the initial reaction exotherm, the remainder of the preemulsion and catalysts were added to the reactor, over time. Specifically, the preemulsion was steadily added to the reactor over a three-hour period, with the reaction temperature maintained at 80° C. The catalyst was metered into the reactor in a stepped feed, at the rate of 0.17 mL/min. during the first hour and thereafter, at a rate of 0.36 mL/min. for two hours.

After a three-hour period, the reaction mixture was heated for an additional 30 minutes at 80° C., and "free" or unreacted monomers were reduced by adding a small amount of initiator and activator in water.

After an additional 30 minutes at 80° C., the contents of the reactor were cooled, and the emulsion polymer product—a synthetic latex—was removed. The pH of the emulsion was raised to between about 7 and 9 by adding base (ammonium hydroxide). By making the emulsion slightly basic, the stability of the emulsion is improved and the viscosity is increased, making the emulsion easier to coat. The glass transition temperature, $T_g$, of the polymer was calculated (Fox Equation) to be −34.5° C. The THF-soluble fraction of the polymer had a $M_n$ of about 28,000 and a $M_w$ of about 157,000. Solids content was about 54–57%.

TABLE IA

PRE-EMULSION

| Monomer | Mass(g) | Monomer Wt. % |
|---|---|---|
| 2-EHA | 226.0 | 66.3 |
| IBOA | 90.0 | 26.4 |
| MMA | 10.0 | 2.9 |
| AA | 10.0 | 2.9 |
| HEA | 5.0 | 1.5 |
| | | 100.0 |

TABLE IA-continued

PRE-EMULSION

| Surfactant Solution | Mass (g) |
|---|---|
| DS10 | 2.4 |
| A246L | 6.0 |
| Water | 80.9 |
| Water Flush | 20.0 |

TABLE IB

INITIAL REACTOR CHARGE

| Component | Mass (g) |
|---|---|
| Water | 130.00 |
| Surfactants | |
| Polystep F9 | 0.60 |
| DS-10 | 0.06 |
| Activator | |
| Hydro AWC | 0.06 |
| Chain Transfer Agent | |
| n-DDM | 0.60 |
| Initiator | |
| $Na_2S_2O_8$ | 0.06 |
| Pre-Emulsion | 30.00 |

TABLE IC

INITIATOR SOLUTION

| Initial Feed | | Subsequent Feed | |
|---|---|---|---|
| Component | Mass (g) | Component | Mass (g) |
| Water | 50.0 | Water | 50.0 |
| Initiator | | Initiator | |
| $Na_2S_2O_8$ | 1.0 | $Na_2S_2O_8$ | 1.0 |
| Base | | Base | |
| 28% $NH_4OH_{(aq)}$ | 2.0 | 28% $NH_4OH_{(aq)}$ | 2.0 |
| | 53.0 | | 53.0 |

TABLE ID

FREE MONOMER REDUCTION

| | Component | Mass (g) |
|---|---|---|
| (1) | Water | 5.0 |
| | Initiator | |
| (2) | $Na_2S_2O_8$ | 0.1 |
| | Initiator | |
| (3) | t-BHP | 0.1 |
| | Activator | |
| | $Na_2S_2O_5$ | 0.1 |

Using the method described above, Examples 2–4 and Comparative Examples (Comp. Ex.) 1–3 were prepared. The monomeric compositions and glass transition temperatures, $T_g$, (calculated using the Fox Equation) for these examples are provided in Table II. Comparative Example 1 essentially differs from Example 1 in that benzyl methacrylate (BZM)

replaces IBOA. Comparative Example 2 lacks IBOA and has increased amounts of MMA and EHA. Comparative Example 3 has only a low (3%) amount of IBOA.

TABLE II

OTHER EMULSION POLYMER EXAMPLES

| Example 2 | Example 3 | Example 4 |
|---|---|---|
| 72% EHA | 68% EHA | 66% EHA |
| 8.9% IBOA | 26% IBOA | 26.5% IBOA |
| 14.6% MMA | 3% MMA | 3% MMA |
| 3% AA | 3% AA | 3% MAA |
| 1.5% HEA | — | 1.5% HEA |
| Tg:−41.3° C. | Tg:−35.5° C. | Tg:−34.7° C. |
| Comp. Ex. 1 | Comp. Ex. 2 | Comp. Ex. 3 |
| 67.5% EHA | 78% EHA | 78% EHA |
| 25% BZM | — | 3% IBOA |
| 3% MMA | 17.5% MMA | 14.5% MMA |
| 3% AA | 3% AA | 3% AA |
| 1.5% HEA | 1.5% HEA | 1.5% HEA |
| Tg:−34.7° C. | Tg:−47.9° C. | Tg:−48° C. |

The emulsion polymerization products and methods described above are used to prepare inherently tacky PSA constructions such as tapes, labels, and the like, particularly self-adhesive postage stamps. To that end, a synthetic latex as described above is coated or otherwise applied to a release liner, dried and married or laminated to a paper, polymeric material or film, or other flexible facestock. Nonlimiting examples of polymeric material facestocks include polyolefins, such as polyethylene and polypropylene; polyesters, such as polyethylene terephthalate (PET); and polyvinyl chloride. Alternatively, the synthetic latex is directly applied to a facestock, dried and then married or laminated to a release liner. Thus, a PSA construction is made by applying the latex to a flexible substrate and driving off the water. Linerless PSA constructions can also be made with the PSAs described herein.

For postage stamp constructions, the facestock is imprinted with postage indicia, i.e., the picture, indication of postal value, etc., one normally associates with postage stamps, either before or after the face stock and PSA are married together.

The emulsions can be coated using conventional coating techniques including, without limitation, slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating.

The adhesive performance of Examples 1–4. Comparative Examples 1–3, and three PSAs (Controls 1, 2 and 3) are presented in Tables III (loop tack and 180° peel), IV (envelope adhesion) and V (shear from stainless steel). Control 1 is a leading acrylic emulsion PSA made from a monomer mixture comprising 2-EHA, vinyl acetate (VA), dioctyl maleate (DOM), AA and MAA. Control 2 is an acrylic emulsion PSA similar to Control 1, but also includes butyl acrylate (BA) and is tackified. Control 3 is a leading rubber-based hot-melt PSA based on a Kraton® styrene-isoprene-styrene polymer. (Kraton® polymers are available from Shell Chemical Co., Houston, Tex.). In each case, test samples were prepared by coating an adhesive on a release paper with a bull nose coater and drying the adhesive for 10 minutes at 70° C. The wet coating weight was adjusted to obtain a dry coating weight of 22±2 g/m². The coated sample was allowed to equilibrate to ambient conditions and was then laminated to 2-mil PET facestock. The laminate construction was conditioned for at least 24 h at 73° F. and 50% RH before adhesive testing.

Loop Tack is a measure of the force required to remove a loop of adhesive-coated facestock from a test substrate after a very short dwell and no external pressure. In our testing, the facestock is 2-mil thick PET and the pull rate is 12-inches per minute. A one-inch by six-inch adhesive coated PET strip is formed into a loop with the adhesive side out. The loop is lowered onto the substrate until the adhesive contacts an area of one square inch. As soon as the tape makes one square inch of contact area with the substrate, the loop is retracted from the substrate. Loop tack is defined as the maximum force required to separate the loop from the substrate. The mode of failure is noted in parentheses; for example, panel (p), cohesive (c) or mixed (m). In the case of a paper or corrugated substrate, the amount of fiber tear or fiber pick is subjectively rated and recorded as a percent. The percent fiber pick is the amount of the tape's surface that is covered by paper fibers. Fiber tear, which indicates a higher level of bonding, is the amount of the tape's surface that is completely covered with paper.

180° Peel Adhesion is a measure of the force required to remove an adhesive coated flexible facestock from a substrate after a specified period of dwell and at a specific angle and removal rate. It is determined in accordance with Pressure-Sensitive Tape Council test PSTC #1. In our testing, the facestock was 2-mil PET, the dwell time was twenty minutes and the pull rate was 12 inches per minute. The adhesive coated strip is placed on the substrate then pressed onto the substrate by rolling twice—once each in opposite directions—with a 4.5 lb rubber roller. After a twenty minute dwell, one end of the test panel is clamped into a tensile tester; the free end of the facestock is doubled back until it is almost touching itself, making an angle of 180° with the substrate, and clamped into the other jaw of the tensile tester. The average force required to separate the adhesive coated facestock from the substrate is recorded as the peel adhesion. The failure mode is noted as described above for the loop tack test.

Shear strength (holding power) is a measure of the cohesiveness or internal strength of the adhesive. In our testing, shear strength was determined in accordance with Pressure-Sensitive Tape Council test method, PSTC #7. The facestock was 2-mil PET and the dwell was 20 minutes. The overlap dimensions were ½"×½" with a static load of 500 grams.

Envelope adhesion was measured by coating the adhesive (emulsion polymer) on a release liner and then transferring the adhesive to a paper facestock that conforms to United States Post Office specification USPS-P-1238C. A 1-inch by 1-inch sample of each construction was adhered to a plain white business envelope. After one minute, the sample was removed by peeling very slowly and in multiple directions. The ratings—G (good), P (poor), F (fair) and E (excellent) are subjective estimates of the amount of fiber tear observed in the peel test.

TABLE III

ADHESIVE PROPERTIES OF SELECTED PSAs

| PSA | ADHESION TO POLYETHYLENE | |
|---|---|---|
| | Loop Tack (N/in) | 180° Peel (N/in) |
| Control 1 | 5.5(p) | 4.9(p) |
| Control 2 | 5.5(p) | 4.9(p) |
| Control 3 | 13.0(p) | 12.0(p) |
| Example 1 | 4.1(p) | 10.2(p) |

TABLE III-continued

ADHESIVE PROPERTIES OF SELECTED PSAs

ADHESION TO POLYETHYLENE

| PSA | Loop Tack (N/in) | 180° Peel (N/in) |
|---|---|---|
| Example 2 | 3.6(p) | 8.1(p) |
| Example 3 | 3.9(p) | 5.0(p) |
| Example 4 | 4.4(p) | 3.5(p) |
| Comp. Ex. 1 | 2.6(p) | 6.0(p) |
| Comp. Ex. 2 | 2.8(p) | 6.2(p) |
| Comp. Ex. 3 | 3.5(p) | 4.4(p) |
| Comp. Ex. 4 | 2.4(p) | 5.6(p) |

ADHESION TO CORRUGATED BOARD

| PSA | Loop Tack (N/in) | % Fiber Pick | 180° Peel (N/in) | % Fiber Tear |
|---|---|---|---|---|
| Control 1 | 8.1 | 10 | 4.9 | 70 |
| Control 2 | 7.8 | 10 | 8.5 | 10 |
| Control 3 | 8.2 | 10 | 11.5 | 10 |
| Example 1 | 10.1 | 35 | 8.4 | 95 |
| Example 2 | 7.4 | 5 | 6.6 | 95 |
| Example 3 | 8.6 | 25 | 7.2 | 95 |
| Example 4 | 7.8 | 25 | 5.6 | 95 |
| Comp. Ex. 1 | 6.8 | 5 | 7 | 95 |
| Comp. Ex. 2 | 7.5 | 5 | 6.2 | 75 |
| Comp. Ex. 3 | 7.5 | 5 | 6.7 | 75FP |

TABLE IV

ENVELOPE ADHESION

| PSA | Adhesion |
|---|---|
| Control 1 | good |
| Control 2 | poor |
| Control 3 | fair |
| Example 1 | excellent |

TABLE V

ADHESIVE SHEAR[1]

| PSA | Shear (min) | Failure Mode |
|---|---|---|
| Control 1 | 109[2] | C |
| Control 2 | 135[3] | C |
| Control 3 | 1300 | C |
| Example 1 | 112 | C |
| Example 2 | 84 | C |
| Example 3 | 31 | C |
| Example 4 | 193 | C |
| Comp. Ex. 1 | 136 | C |
| Comp. Ex. 2 | 134 | C |
| Comp. Ex. 3 | 67 | C |

[1]From stainless steel
[2]Best value; the average shear value for Control 1 is about 90 minutes.
[3]Best value; the average shear value for Control 2 is about 70 minutes.

The adhesive test results show that emulsion PSAs prepared in accordance with the present invention exhibit adhesion to both low-energy surfaces and corrugated board comparable to or better than leading tackified and untackified acrylic emulsion PSAs and a leading rubber-based hot melt PSA. The data also shows the excellent adhesion to bond paper exhibited by the PSAs of the present invention, e.g., Example 1. Example 2, having a 9% IBOA content, performed well on both polyethylene (PE) and corrugated board, though not as well as Example 1, having a 26% IBOA content. In general, as IBOA content is lowered, adhesion to low-energy surfaces is reduced. Indeed, Comparative Examples 1 and 2, having no IBOA, showed markedly reduced adhesive performance. Comparative Example 3, having only a low (3%) amount IBOA, also exhibited reduced adhesive performance. Comparative example 1, made with BZM in place of IBOA, exhibited a less favorable balance of adhesive properties—shear, PE adhesion and corrugated adhesion—despite the fact that BZM forms a homopolymer with roughly the same glass transition temperature as IBOA.

Although not bound by theory, the excellent performance characteristics of the adhesives of the present invention are believed to be due to both the monomeric composition of the polymers—including, in particular, the isobornyl acrylate monomer—and the fact that the polymers are formed by emulsion or solvent polymerization, rather than bulk polymerization, such as on web, UV-irradiated bulk polymerization of a syrup of monomers. It is believed that the bulky isobornyl side groups disrupt or affect orderliness in the polymer structure, and the ideal PSA is believed to have a polymer structure that is amorphous and devoid of any side-chain organization or orderliness.

Although the chemistry of emulsion polymerization involves free radical reactions that are common to many bulk and solution polymerization systems, in emulsion polymerization the physical degree of subdivision of the reaction locus and their colloidal nature has a profound influence on the course of polymerization and the characteristics of the product and its performance. Bulk polymerization, of course, tends to yield high molecular weight polymers in a homogeneous phase. In contrast, the emulsion polymerization process of the present invention is heterogenous, and yields a colloidal dispersion of polymer particles sometimes call a latex.

Advantageously, the emulsion and solvent polymers described herein exhibit PSA behavior when coated on a facestock and dried. The adhesives perform quite well on a variety of substrates, and are well suited for a variety of applications, including in self-adhesive postage stamps. Indeed, the high adhesion to paper substrates makes removal and re-use of stamps prepared with the adhesives impractical, due to the telltale fiber tear mark that results when attempts are made to peel off the stamp, even after only a five minute dwell.

In an alternate embodiment, inherently tacky, acrylic polymers are prepared using solvent (solution) polymerization. A monomer mixture comprising an ethylenically unsaturated monomer having an isobornyl group (for example, IBOA) and one or more additional monomers (for example, alkyl acrylates, polar monomers, etc.) is dissolved in an organic solvent, a polymerization initiator is added to the solution, and polymerization is allowed to proceed, preferably in an oxygen-free atmosphere. The resulting viscous polymer is diluted with more solvent, and then coated on a release liner, dried, and laminated to a facestock. Example 5 is a representative, nonlimiting example of a solution polymer prepared in accordance with the present invention. Control 4 illustrates a solution polymer that lacks IBOA.

EXAMPLE 5

A monomer mixture was prepared by mixing isobornyl acrylate (30.1 g), isooctyl acrylate (75.1 g) and acrylic acid (2.0 g) in ethyl acetate (110.2 g). An initiator, Vazo 64 (0.054 g) (available from DuPont de NeMours, E.I., Co., Wilmington, Del.) was added, and the solution was transferred to a reactor bottle and flushed with nitrogen for five minutes. The bottle was sealed and immersed in an oil bath and heated at 60° C. for 24 hours. The resulting viscous polymer was discharged, and ethyl acetate was added to reduce the solids content to 36%. $T_g$ (measured by differential scanning calorimetry, DSC) was −24° C. The solution was coated on a silicone release liner and dried at 70° C. for 10 minutes. The resulting 30 g/m² film was laminated to a 2-mil thick Mylar® facestock, and 180° peel adhesion to stainless steel, polypropylene and polyethylene panels was measured, after a 24 hour dwell. The results are presented in Table VI.

Control 4

A monomer mixture was prepared by mixing isooctyl acrylate (57.2 g), methyl acrylate (31.1 g), acrylic acid (1.8 g) and ethyl acetate (135.3 g). Vazo 64 (0.048 g) was added as an initiator, and the solution was transferred to a reactor bottle and flushed with nitrogen for five minutes. The bottle was sealed and immersed in an oil bath and heated at 60° C. for 24 hours. The resulting clear viscous polymer was discharged, and ethyl acetate was added to reduce the solids content to 27%. $T_g$ (measured by DSC) was −26° C. The solution was coated on a silicone release liner and dried at 70° C. for 10 minutes. The 30 g/m² film was laminated to a 2-mil thick Mylar® film, and 180° peel adhesion to stainless steel, polypropylene and polyethylene panels was measured, after a 24 hour dwell. The results are presented in Table VI.

TABLE VI

180° PEEL ADHESION (N/in) FOR A SOLVENT POLYMER

| Sample | 180° Peel to Stainless Steel | 180° Peel to Polypropylene | 180° Peel to Polyethylene |
| --- | --- | --- | --- |
| Example 5 | 16.8 | 11.1 | 6.7 |
| Control 4 | 13.2 | 4.5 | 3.1 |

Self-Adhesive Postage Stamps

In one embodiment of the invention, self-adhesive stamps are prepared by the same general method as other constructions described herein. Stamps can be provided in a variety of presentations, including, for example, single stamps, long strips suitable for rolling, large sheets, and small sheetlets suitable for ATM distribution. The facestocks, PSAs and release liners are made or selected to comply with the requirements, if any, of stamp-issuing governments. For instance, the requirements for United States stamps are provided in government specification USPS-P-1238C (Appendix A hereto).

EXAMPLE 6

A simulated postage stamp (lacking postage indicia) was prepared by coating a broad spectrum adhesive latex (described below) on a release liner, allowing it to dry, and laminating the adhesive to a facestock having opposed first and second faces. The construction had the following characteristics:

Facestock

The facestock was 61 lb/ream Westvaco Stamp Stock #073-17.

Release Liner

The release liner was made from 80 lb/ream machine-finished release paper, coated on one side with General Electric 6100 solventless silicone. Suitable release liner paper is available from, for example, Rhinelander Paper (Rhinelander, Wis.).

PSA

The adhesive used was a broad spectrum adhesive ("BSA")—an inherently tacky, acrylic emulsion polymer containing IBOA monomers, prepared in the manner described above. The exact formulation is presented in Table VII.

TABLE VII

Broad Spectrum Adhesive (BSA) for Postage Stamps

| Component | Wt. % of Total | Monomer Wt.% |
| --- | --- | --- |
| Deionized water | 43.08 | |
| EHA | 35.87 | 66.25 |
| IBOA | 14.30 | 26.41 |
| MMA | 1.59 | 2.94 |
| AA | 1.59 | 2.94 |
| NH$_4$OH, 28% soln. | 0.99 | |
| A246L | 0.95 | |
| 2-HEA | 0.79 | 1.46 |
| DS-10 | 0.39 | |
| Na$_2$S$_2$O$_8$ | 0.19 | |
| n-DDM | 0.13 | |
| Polystep F9 | 0.10 | |
| Hydro AWC | 0.02 | |
| t-BHP | 0.02 | |
| Na$_2$S$_2$O$_5$ | 0.02 | |
| TOTAL | 100.00 | 100.00 |

Using the broad spectrum adhesive of Example 6 and six other adhesives (Controls 5–10), a set of simulated postage stamp constructions (lacking postage indicia) was prepared using the facestock and release liner described in Example 6. The adhesive constructions were then evaluated for adhesion to a variety of substrates. The control adhesives were selected based on their potential utility as postage stamp adhesives.

Except where otherwise noted, each simulated postage stamp construction was aged for one, three or six weeks, at ambient, elevated and/or reduced temperature and humidity (RH), as indicated in Tables VIII, IX, X and XI. The constructions were then adhered to one of five different envelope substrates:

B3: 25% Cotton Gilbert Bond
W3: 24# Signet White Wove
K3: Signet Brown Kraft
W1: Staples White Wove
W2: Westvaco Columbia White Wove.

More particularly, after the adhesive constructions were prepared and aged, two 1"×2" (2.54×5.08 cm)samples of each construction were removed from their release liner and applied to an envelop substrate with no more than light, even pressure. The two replicates of each construction were allowed to "dwell" (remain in contact with the envelope substrate) for 30 seconds, 5 minutes or 30 minutes, and then removed from the substrate slowly and as carefully as possible to avoid tearing the envelop or sample. To facilitate removal, each sample was bent back almost on itself and peeled very slowly from different directions. Adhesive performance was evaluated using a fiber/facestock tear test, with each sample being rated using the following 5 point scale:

1—clean removal from envelope substrate
2—slight fiber pick of envelope substrate
3—<50% tear of envelope substrate 4—>50% tear of envelope substrate
5—100% fiber tear of envelope substrate A score of 3 or higher is considered to "pass" USPS requirements. Thus, for each adhesive and each envelope substrate, a total of 72 data points were generated (2 replicates×3 aging times×4 temperature/humidity conditions×3 dwell times=72). Tables VIII through XVIII summarize the results of the adhesive performance tests.

More particularly, Tables VIII through XI show the sum of the fiber/facestock test results for each sample on each substrate after allowing each sample to age for one, three or six weeks at one of four temperatures and humidities and after being allowed to dwell for 30 seconds, 5 minutes, or, 30 minutes. Each entry represents the sum over three aging periods and three dwell times, with two replicates for each condition. A total over all envelope stocks is also provided in each table. The results indicate that the BSA constructions perform better than the other constructions, regardless of the temperature or humidity of aging.

TABLE VIII

Compiled Adhesion Test Results After Aging at 23° C./50% RH for One, Three and Six weeks.

| Envelope Stock | Adhesive Samples | | | | | | |
|---|---|---|---|---|---|---|---|
| | #1 | #2 | #3 | #4 | #5 | #6 | BSA |
| B3 | 22 | 18 | 19 | 21 | 22 | 28 | 39 |
| W3 | 31 | 21 | 51 | 57 | 46 | 49 | 70 |
| K3 | 51 | 29 | 56 | 60 | 57 | 49 | 66 |
| W1 | 64 | 47 | 74 | 74 | 69 | 65 | 66 |
| W2 | 22 | 21 | 38 | 60 | 45 | 38 | 65 |
| Total | 190 | 136 | 238 | 272 | 239 | 229 | 306 |

TABLE IX

Compiled Adhesion Test Results After Aging at 38° C./90% RH for One, Three and Six weeks.

| Envelope Stock | Adhesive Samples | | | | | | |
|---|---|---|---|---|---|---|---|
| | #1 | #2 | #3 | #4 | #5 | #6 | BSA |
| B3 | 18 | 18 | 20 | 19 | 19 | 19 | 27 |
| W3 | 19 | 25 | 47 | 51 | 45 | 32 | 66 |
| K3 | 21 | 31 | 52 | 60 | 51 | 42 | 62 |
| W1 | 24 | 43 | 74 | 72 | 61 | 57 | 66 |
| W2 | 18 | 22 | 40 | 41 | 42 | 21 | 54 |
| Total | 100 | 139 | 233 | 243 | 218 | 171 | 275 |

TABLE X

Compiled Adhesion Test Results After Aging at −40° C./ ambient RH for One, Three and Six weeks.

| Envelope Stock | Adhesive Samples | | | | | | |
|---|---|---|---|---|---|---|---|
| | #1 | #2 | #3 | #4 | #5 | #6 | BSA |
| B3 | 22 | 18 | 20 | 19 | 18 | 28 | 44 |
| W3 | 35 | 33 | 47 | 51 | 47 | 44 | 66 |
| K3 | 50 | 44 | 59 | 65 | 53 | 55 | 64 |
| W1 | 54 | 62 | 73 | 73 | 61 | 63 | 67 |
| W2 | 19 | 25 | 45 | 52 | 46 | 37 | 66 |
| Total | 190 | 182 | 244 | 260 | 225 | 227 | 307 |

TABLE XI

Compiled Adhesion Test Results After Aging at 70° C./ambient RH for One, Three and Six weeks.

| Envelope Stock | Adhesive Samples | | | | | | |
|---|---|---|---|---|---|---|---|
| | #1 | #2 | #3 | #4 | #5 | #6 | BSA |
| B3 | 18 | 20 | 18 | 19 | 19 | 26 | 34 |
| W3 | 35 | 29 | 53 | 62 | 50 | 41 | 61 |
| K3 | 43 | 43 | 62 | 58 | 53 | 49 | 64 |
| W1 | 52 | 55 | 74 | 72 | 69 | 63 | 67 |
| W2 | 21 | 27 | 47 | 53 | 48 | 29 | 66 |
| Total | 169 | 174 | 254 | 264 | 239 | 208 | 292 |

Tables XII through XIV show the sum of the fiber/facestock test results for each sample on each substrate after being aged for one, three or six weeks, at four temperature/humidity conditions, and after being allowed to dwell for 30 seconds, 5 minutes and 30 minutes. Two replicates were tested at each condition. The results indicate that the BSA constructions perform well after both short and long aging periods, and better than the other constructions, after each of the three aging periods.

TABLE XII

Compiled Adhesion Test Results After Aging for One Week.

| Envelope Stock | Adhesive Samples | | | | | | |
|---|---|---|---|---|---|---|---|
| | #1 | #2 | #3 | #4 | #5 | #6 | BSA |
| B3 | 27 | 26 | 25 | 27 | 29 | 33 | 62 |
| W3 | 40 | 41 | 47 | 68 | 57 | 62 | 87 |
| K3 | 52 | 52 | 84 | 79 | 69 | 73 | 95 |
| W1 | 81 | 78 | 116 | 113 | 97 | 96 | 96 |
| W2 | 28 | 38 | 73 | 68 | 63 | 46 | 78 |
| Total | 228 | 235 | 345 | 355 | 315 | 310 | 418 |

TABLE XIII

Compiled Adhesion Test Results After Aging for Three Weeks.

| Envelope Stock | Adhesive Samples | | | | | | |
|---|---|---|---|---|---|---|---|
| | #1 | #2 | #3 | #4 | #5 | #6 | BSA |
| B3 | 25 | 24 | 27 | 24 | 25 | 31 | 41 |
| W3 | 32 | 33 | 76 | 74 | 72 | 55 | 94 |
| K3 | 64 | 53 | 66 | 87 | 77 | 65 | 78 |
| W1 | 63 | 75 | 83 | 88 | 84 | 87 | 98 |
| W2 | 25 | 32 | 37 | 71 | 52 | 43 | 89 |
| Total | 209 | 217 | 289 | 344 | 310 | 281 | 400 |

TABLE XIV

Compiled Adhesion Test Results After Aging for Six Weeks.

| Envelope Stock | Adhesive Samples | | | | | | |
|---|---|---|---|---|---|---|---|
| | #1 | #2 | #3 | #4 | #5 | #6 | BSA |
| B3 | 28 | 24 | 25 | 27 | 24 | 37 | 41 |
| W3 | 48 | 34 | 75 | 79 | 59 | 49 | 82 |

TABLE XIV-continued

Compiled Adhesion Test Results
After Aging for Six Weeks.

| Envelope Stock | Adhesive Samples | | | | | | |
|---|---|---|---|---|---|---|---|
| | #1 | #2 | #3 | #4 | #5 | #6 | BSA |
| K3 | 49 | 42 | 79 | 77 | 68 | 57 | 83 |
| W1 | 60 | 54 | 96 | 90 | 79 | 65 | 72 |
| W2 | 27 | 25 | 60 | 67 | 66 | 36 | 84 |
| Total | 212 | 179 | 335 | 340 | 296 | 244 | 362 |

Table XV shows the sum of the fiber/facestock test results for each sample on each substrate after allowing a sample to dwell for 30 seconds, 5 minutes or 30 minutes. Tests were performed immediately after the constructions were prepared, with no aging. Two replicates of each construction were tested at each condition. The results show that even after no aging, the BSA constructions generally perform as well as or better than the other constructions on all envelope substrates.

TABLE XV

Compiled Adhesion Test Results - No Aging

| Envelope Stock | Adhesive Samples | | | | | | |
|---|---|---|---|---|---|---|---|
| | #1 | #2 | #3 | #4 | #5 | #6 | BSA |
| B3 | 6 | 6 | 7 | 6 | 7 | 10 | 8 |
| W3 | 10 | 14 | 10 | 19 | 11 | 18 | 19 |
| K3 | | | | | | | |
| W1 | 17 | 21 | 20 | 23 | 21 | 24 | 23 |
| W2 | 7 | 9 | 6 | 10 | 7 | 13 | 14 |
| Total | | | | | | | |

Tables XVI through XVIII show the sum of the fiber/facestock test results for each sample on each substrate after allowing each sample to dwell for 30 seconds, 5 minutes or 30 minutes. Each entry in the Tables represents the sum over four aging conditions and three aging periods, with two replicates tested under each condition. The results show that at each dwell time, the BSA constructions perform better than the other constructions.

TABLE XVI

Compiled Adhesion Test Results
After a 30 Second Dwell

| Envelope Stock | Adhesive Samples | | | | | | |
|---|---|---|---|---|---|---|---|
| | #1 | #2 | #3 | #4 | #5 | #6 | BSA |
| B3 | 24 | 24 | 25 | 26 | 26 | 28 | 37 |
| W3 | 29 | 32 | 55 | 43 | 77 | 44 | 76 |
| K3 | 45 | 44 | 58 | 60 | 68 | 70 | 71 |
| W1 | 61 | 62 | 96 | 74 | 97 | 65 | 74 |
| W2 | 24 | 25 | 35 | 44 | 64 | 37 | 73 |
| Total | 183 | 187 | 269 | 247 | 332 | 244 | 331 |

TABLE XVII

Compiled Adhesion Test Results
After a 5 Minute Dwell

| Envelope Stock | Adhesive Samples | | | | | | |
|---|---|---|---|---|---|---|---|
| | #1 | #2 | #3 | #4 | #5 | #6 | BSA |
| B3 | 24 | 24 | 25 | 27 | 28 | 29 | 43 |
| W3 | 32 | 30 | 59 | 67 | 65 | 61 | 90 |
| K3 | 44 | 50 | 84 | 76 | 85 | 56 | 90 |
| W1 | 72 | 73 | 95 | 88 | 90 | 85 | 96 |
| W2 | 30 | 35 | 66 | 61 | 61 | 31 | 82 |
| Total | 202 | 212 | 329 | 319 | 329 | 262 | 401 |

TABLE XVIII

Compiled Adhesion Test Results
After a 30 Minute Dwell

| Envelope Stock | Adhesive Samples | | | | | | |
|---|---|---|---|---|---|---|---|
| | #1 | #2 | #3 | #4 | #5 | #6 | BSA |
| B3 | 32 | 26 | 27 | 25 | 24 | 44 | 64 |
| W3 | 59 | 46 | 84 | 78 | 79 | 61 | 97 |
| K3 | 70 | 51 | 87 | 78 | 90 | 71 | 94 |
| W1 | 72 | 72 | 104 | 98 | 104 | 64 | 96 |
| W2 | 26 | 36 | 69 | 76 | 81 | 57 | 96 |
| Total | 259 | 231 | 371 | 355 | 378 | 297 | 447 |

Overall, the test results presented in Tables VIII through XVIII indicate that the BSA constructions—which contain IBOA-based polymers—perform better than the controls, on all substrates, regardless of the test conditions.

The present invention has been illustrated by preferred and exemplary embodiments. but is not limited thereto. Other modifications to the PSAs and self-adhesive stamp constructions can be made without departing from the invention. For example, in an alternative embodiment, a tackifier can be added to the PSA formulation to improve adhesion to certain substrates. Representative, nonlimiting examples of suitable tackifiers are found in U.S. Pat. Nos. 5,623,011 (Bernard), 4,477,613 (Evans et al.) and 4,654,389 (Graham et al.), each of which is incorporated herein by reference.

It will also be appreciated that the adhesive polymer can be prepared and/or applied to a facestock through means other than those described above. For example, an acrylic PSA containing a polymerized monomer mixture including IBOA can be prepared by bulk polymerization and then applied (or married to) a postage stamp facestock as a hot melt, rather than as an emulsion polymer. In another embodiment, the polymer can be prepared in solution and applied as a solvent-borne coating.

United States Postal Service Specification Paper, Stamp, Pressure-Sensitive Adhesive 1. Scope 1.1 Scope—This specification covers pressure-sensitive adhesive (PSA) stamp paper that is to be used for producing postage stamps.

1.2 Qualified Suppliers—Suppliers who have formally demonstrated their ability to produce stamp paper (face stock) and pressure sensitive adhesive (PSA) in compliance with the requirements of this specification are listed in Attachment B (Qualified Product List (QPL)). It is a mandatory requirement of this specification that all stamp paper procured for U.S. postage stamp production be obtained from one of the qualified suppliers listed in Attachment B. Prospective new suppliers who seek to be listed on the QPL may contact Stamp Acquisition to obtain a copy of the Self-Qualification Protocol.

2. Applicable Documents 2.1 Government Documents—The following documents of the issue in effect on the date of invitation for bids or request for proposal form a part of this specification to the extent specified herein.

Standards
Federal

FED-STD-123 Marking for Shipment (Civil Agencies)
(Copies of Federal specifications and standards may be obtained from the Federal Supply Service Bureau, Specification Section, 470 E L'Enfant Plaza SW, Suite 8100, Washington, D.C. 20407-0001.)

United States Postal Service (USPS)

USPS-STD-22 Quality Assurance System for Postage Stamps and Related Products
(Copies of USPS specifications, standards, and drawings may be obtained from Procurement Quality Assurance, Purchasing, U.S. Postal Service Headquarters, 475 L'Enfant Plaza West, SW, Washington, D.C. 20260-6204.)

Other Publications
Federal

| Code of Federal Regulations (CFR) | |
| --- | --- |
| 29 CFR 1910 Part 1200 | Hazard Communication Standard (Occupational Safety and Health Administration). See also Federal Register Vol 48, No 228 Nov 25, 1983 |
| 40 CFR 250 Section 250.4 | Environmental Protection Agency (EPA) Guideline for Federal Procurement of Paper and Paper Products Containing Recovered Materials. See also Federal Register Vol 53, No 23546, June 22, 1988 |
| 40 CFR 720 | Premanufacture Notification; Premanufacture Notice Requirements and Review Procedures |
| 21 CFR Part 175.105 | Indirect Food Additives |
| 21 CFR Part 175.125 | Adhesives and Components of Coatings |
| 21 CFR Part 176.170 | Components of Paper and Paperboard in Contact With Aqueous and Fatty Foods |
| 21 CFR Part 176.180 | Components of Paper and Paperboard in Contact With Dry Food |
| 16 CFR Part 1500.3 | Definitions of Toxic and Hazardous Materials |

(Copies of CFR documents may be obtained from the Superintendent of Documents, U.S. Government Printing Office (GPO), Washington D.C. 20402.)

2.2 Non-Government Documents—The following documents form a part of this specification to the extent specified herein. Unless otherwise indicated, the issue in effect on date of invitation for bids or request for proposal shall apply.

Standards

| American National Standards Institute (ANSI) | |
| --- | --- |
| ANSI/ASQC Z1.4 | Sampling Procedures and Tables for Inspection by Attributes |

(Copies of ANSI documents may be obtained from the American National Standards Institute, 1 1 West 42nd Street, 13th Floor, New York, N.Y. 10036.)

Tests

| American Society for Testing and Materials (ASTM) | |
| --- | --- |
| ASTM D 2244 | Calculation of Color Differences from instrumentally Measured Color Coordinates |
| ASTM D 3121 | Standard Test Method for Tack of Pressure-Sensitive Adhesives by Rolling Ball |

(Copies of ASTM documents may be obtained from the American Society for Testing and Materials, 1916 Race Street, Philadelphia, Pa. 19103-1187)

| Technical Association of the Pulp and Paper Industry (TAPPI) | |
| --- | --- |
| TAPPI T 400 | Sampling and Accepting a Single Lot of Paper, Paperboard, Containerboard or Related Products |
| TAPPI T 401 | Fiber Analysis of Paper and Paperboard |
| TAPPI T 402 | Standard Conditioning and Testing Atmospheres for Paper, Board, Pulp Handsheets, and related Products |
| TAPPI T 404 | Tensile Breaking Strength and Elongation of Paper and Paperboard |
| TAPPI T 410 | Grammage of Paper and Paperboard (Weight Per Unit Area) |
| TAPPI T 411 | Thickness (Caliper) of Paper, Paperboard, and Combined Board |
| TAPPI T 412 | Moisture in Paper and Paperboard |
| TAPPI T 413 | Ash in Paper and Paperboard |
| TAPPI T 414 | Internal Tearing Resistance of Paper (Elmendorf-Type Method) |
| TAPPI T 425 | Opacity of Paper (15 Degrees/Diffuse Illuminant A, 89 Percent Reflectance Backing and Paper Backing) |
| TAPPI T 437 | Dirt in Paper and Paperboard |
| TAPPI T 452 | Brightness of Pulp, Paper and Paperboard (Directional Reflectance at 457 nm) |
| TAPPI T 453 | Effect of Dry Heat on Properties of Paper |
| TAPPI T 460 | Air Resistance of Paper |
| TAPPI T 480 | Specular Gloss of Paper and Paperboard at 75 Degrees |
| TAPPI T 489 | Stiffness of Paper and Paperboard |
| TAPPI T 529 | Surface pH Measurement of Paper |
| TAPPI T 538 | Smoothness of Paper and Paperboard (Sheffield Method) |

(Copies of TAPPI documents may be obtained from the Technical Association of the Pulp and Paper Industry, 15 Technology Parkway South, P.O. Box 105113, Norcross, Ga. 30092-2910.)

3. Requirements 3.1 Description—The stamp paper covered by this specification consists of components defined as the "face stock", "adhesive layer" or "PSA" and "release liner backing" or "linerless release coating". The total construction may be referred to hereafter as the "sandwich". Each of these components in the construction on shall possess the specific characteristics needed to meet printing, converting, and mail processing requirements as specified herein.

3.2 First Article—When specified (see 6.2), first article inspection shall be conducted as specified in 4.3.

3.3 Materials—The stamp paper materials and requirements (face stock, liner and PSA) shall be as specified herein and in Tables I, II, and III, respectively. Tables also contain the corresponding test methods that shall be used to verify conformance with the specified requirements. Test methods that require further information and cannot be easily listed in the table shall be as specified in sections 4.6.2.1 through 4.6.2.3.

3.3.1 Fiber—The fiber used in the face stock and the liner shall be 100 percent chemical wood pulp.

3.3.2 Recycled Materials—In accordance with Federal procurement policy, the USPS encourages the use of the highest percentage of recovered materials practicable in the manufacture and delivery of the finished material specified herein, as long as all specification requirements are fulfilled. The EPA defines recovered material in 40 CFR 250 Section 250.4 paragraph (kk). (See also Federal Register Vol 53, No 23546, Jun. 22, 1988.)

3.3.3 Toxicity—No materials, which are toxic or potentially harmful, shall be used in construction of the sandwich. See Federal document 21 CFR Part 1500.3, 21 CFR Part 176.170, 21 CFR Part 176.80, 21 CFR Part 175.105 and 21 CFR Part 175.125.

TABLE I

Face Stock Requirements
The following table identifies properties for the face stock. They are classified as required, target or monitored. Classification meanings are as follows: Required-requirement must be as specified. Target-contractor should actively work toward satisfying the requirements and the property should approximate to the greatest extent possible the requirement value. Monitor-property should be measured and reported with test data submission.

| PROPERTY | UNIT | REQUIREMENT | METHOD | CLASSIFICATION |
|---|---|---|---|---|
| 1. Basic weight | g/m2 | 90 ± 5% | TAPPI T 410 | Required |
| 2. Caliper | micron | 90 ± 10% | TAPPI T 411 | Target |
| 3. Fiber content | % | 100 chemical wood pulp | TAPPI T 401 | Required |
| 4. Ash | % | 20 max | TAPPI T 413 | Required |
| 5. Formation | — | As uniform as possible, no clouds | | Target |
| 6. Dry Tensile MD/1 CD/1 | kg/15 mm | 5.5–6.5 3.5–4.5 | TAPPI T 404 | Target |
| 7. Tear | gms | 60 ± 15% average of MD & CD | TAPPI T 414 | Target |
| 8. Compressibility | s/100 ml | 35 ± 20% | TAPPI T 460 also see 4.6.2.1.a | Monitor |
| 9. Abrasion | μg | Less than 500 | USPS P 1238 Appendix 1 Section 10 | Monitor |
| 10. Stiffness-Taber | g/cm | — | TAPPI T 489 | Monitor |
| 11. Smoothness (Sheffield) | SU | 10–50 | TAPPI T 538 | Required |
| 12. Parker Print Surf Roughness | PPSU/2 | 1.5 to 2.5 | USPS P 1238 Appendix 1 Section 30 | Required |
| 13. K & N Ink Absorption | % | 22–36 | See 4.6.2.1.d | Target |
| 14. Opacity | % | 89 min | TAPPI T 425 | Required |
| 15. Gloss - 75° | % | 50 ± 20% | TAPPI T 480 | Target |
| 16. Brightness | % | 81 min | TAPPI T 452 | Required |
| 17. Surface Acidity | pH | 7.5 ± 1.0 | TAPPI T 529 | Required |
| 18. Internal Bond | — | Suitable for offset intaglio printing | | Required |
| 19. Moisture | % | 4.5–6/3 | TAPPI T 412 | Target |
| 20. Paper Color CIE 1976 Uniform L* Color Space a* b* | Min. 92.2 -0.2 +2.2 | Max. 93.8 +0.3 +3.2 | ASTM D 2244 | Required |
| 21. Red Fluorescence | PMU | 3 max | USPS P 1238 Appendix I, Section 40 See also 4.6.2.1.e | Required |
| 22. Phosphorescence | PMU | Type I - 175 ± 20 Type II - 225 ± 25 Type III - No phosphor | USPS P 1238 Appendix I, Section 40 See also 4.6.2.1.f | Required |
| 23. Cancellation | minutes | 5 max | USPS P 1238 Appendix I, Section 20 See also 4.6.2.1.g | Required |
| 24. Cleanliness (i) Avg ct per sq foot, larger than 0.30 mm² (ii) Avg total area, mm²/ft² | | 1 max 2 max | TAPPI T 437 | Required |

/1 MD = Machine Direction, CD = Cross Direction
/2 PPSU = Parker Print Surf Unit
/3 At equilibrium with 50% RH/73° F.

TABLE II

Release Liner Requirements
The following table identifies properties required for the release liner backing.

| PROPERTY | UNIT | REQUIREMENT | METHOD |
|---|---|---|---|
| 1. Basis Weight | g/m² | | TAPPI T 410 |
| a. For Sheetlets | | 130 ± 5% | |
| b. For Coils/Panes | | 70 ± 5% | Target |
| 2. Printability | — | Printability on both sides | — |
| 3. Opacity | % | | TAPPI T 425 |
| a. For Sheetlets | | 89 min | Target |
| b. For Coils | | 62 max | |
| 4. Brightness | % | | TAPPI T 452 |
| a. For Sheetlets | | 81 min | |
| b. For Coils | | 72 min | |
| 5. Liner Color CIE 1976 | Min. | Max. | ASTM D 2244 |
| Uniform Color Space L* | 89.0 | 91.0 | Required |
| a* | −1.8 | +0.6 | |
| b* | +0.25 | +1.75 | |
| 6. Printing | — | See 4.6.2.2.b | — |

TABLE III

PSA Requirements
The following table identifies properties for the PSA. They are classified as required, target or monitored. Classification meanings are as follows: Required-requirement must be as specified. Target-contractor should actively work toward satisfying the requirements and the property should approximate to the greatest extent possible the requirement value.
Monitor-property should be measured and reported.

| PROPERTY | UNIT | REQUIREMENT | METHOD | CLASSIFICATION |
|---|---|---|---|---|
| 1. Track (rolling ball method) | inches | — | ASTM D 3121 | Monitor |
| 2. Peel adhesion (a) face stock (b) release liner | lb/in g/2 in | 0.8–1.5 75–150 | USPS P 1238 Appendix II, Sections 30 & 40 | Target |
| 3. Water removability | — | Complete removal of adhesive from eh stamp in 30 min | USPS P 1238 Appendix II, Section 50 | Required |
| 4. Accelerated Aging | — | The following properties shall not be visible in the sandwich: (i) migration (ii) penetration (iii) curling (iv) oozing (v) flagging (vi) peeling | USPS P 1238 Appendix II, Section 60 | Required |
| 5. Permanence | — | Fiber tear (distortion) to the stamp or the surface to which it was applied within 10–30 seconds | USPS P 1238 Appendix II, Section 70 | Required |

3.3.4 Material Safety Data Sheets (MSDS)—MSDS's shall be submitted in triplicate to an appointed USPS COR at least 2 weeks prior to submission of any sample for testing as stipulated in 4.3.2. No sample shall be submitted without an MSDS. All MSDS's submitted shall comply with Occupational Safety and Health Administration (OSHA) requirements as listed in 29 CFR 1910, Part 1200, paragraphs (g) and (i), (see also Federal Register Vol 48, No 228, Nov. 25, 1983).

3.3.5 Certification of Compliance—The contractor shall certify compliance with the regulations set forth in 40 CFR 720, Premanufacture Notification. The contractor shall submit a copy of the certification to the COR at least 2 weeks prior to submission of any sample for inspection and testing as stipulated in 4.3.2.

3.4 Performance—The total "sandwich" shall perform as specified in 3.4.1 through 3.4.11. The "sandwich" shall be suitable for processing and converting operations, such as sheeting, diecutting (either on-line or off-line), processing on coiling equipment, etc.

3.4.1 Adhesion—The non-print side of the face stock shall be coated with a PSA which shall enable the paper to adhere tenaciously for an indefinite period of time to various substrates to which it may be applied. The adhesive shall not be "leggy" upon attempts at removal. The adhesive on the face stock shall conform to the requirements in Table III and it shall be tested for conformance to those requirements as specified in 4.6.2.3.

3.4.2 Abrasion—The face stock shall not contain abrasive materials at levels which shall cause exceptional wear (more than standard) on dies, cutting blades or cylinders. The wear on the needle shall be less than 500 micrograms. (For test procedure see Appendix I, section 10.)

3.4.3 Cancellation—The primary surface of the face stock must be receptive to glycol-based inks used in stamp cancellation. A good cancellation on the face stock shall dry within 5 minutes (For test procedure see Appendix I, Section 20.)

3.4.4 Cracking—The face stock shall exhibit no cracking when folded over and creased in either direction. The crease shall be made by making one pass with a hard rubber-covered, steel roller. The rubber-covered steel roller shall be 3.25±0.1 inches in diameter and 1.75±0.05 inches in width, covered with rubber approximately ¼ inch in thickness. The roller shall have a shore scale A durometer hardness of 75 to 85. The cylindrical surface of the roller shall be void of any concave or convex deviations so that the roller will apply uniform pressure across the width of its entire surface. The weight of the roller proper, which applies pressure to the specimen, shall be 4.5±0.1 pounds.

3.4.5 Aging—The face stock shall exhibit no noticeable change (more than 20 percent) in color or physical properties after two years of storage at ambient conditions (50 percent relative humidity [RH] and 73° F.). The accelerated dry-heat aging test shall be performed at 105° C. for 4 hours, per TAPPI T 453.

3.4.6 Process—The "sandwich" construction shall be suitable for printing by either of the following printing processes or combination of such processes.

(a) The face stock printing surface shall be suitable for reproduction by gravure and intaglio processes with a resolution of up to 300 dots per inch (300 line screen) whereas offset process shall be capable of a resolution of 250 dots per inch.

(b) The release liner backing shall be printable on both sides, with the backside (non-silicone side) capable of reproducing a 175-line screen of good quality when printed by gravure, flexo or offset methods.

3.4.7 Ink—The "sandwich" construction shall be receptive to printing with oil-based, solvent-based and water-based inks.

3.4.8 Quality—The print quality obtained from each of the printing processes shall have none of the following common defects:

Intaglio
—break up of fine lines
—print sharpness (lack of)
Gravure
—dot ship (snowflaking)
Offset
—mottling
—surface picking
—slitter dust accumulation 3.4.9 Face-Stock Coating—The face-stock coating shall utilize non-soluble binders and components, and shall not dissolve or fail when immersed in warm or cold tap water for 30 minutes.

3.4.10 Curl—The curl of the "sandwich" construction shall be measured by utilizing two vertical scales placed on a plane surface. The edge of the sheetlet (size 160 by 85 mm) shall be lifted up to the vertical scales such that curl can be measured directly. The measurement shall be taken on both sides, i.e., left and right and averaged. The curl shall be less than 5 mm whether the sheetlet is measured individually or with four sheetlets stacked together.

3.4.11 Accelerated Aging—The following characteristics shall not be visible in the "sandwich" when exposed to different environmental conditions as defined in Appendix II, Section 70 for various durations.

(i) migration
(ii) penetration
(iii) curling
(iv) oozing
(v) flagging
(vi) peeling The terms (i) to (vi) have been defined in section 6.3.

3.5 Design and Construction 3.5.1 Roll Construction—The paper shall be wound in rolls. All rolls shall be tightly wound and slit to the specified size without any edge cracking. Telescopic rolls and rolls with collapsed cores are not acceptable. The rolls and cores shall comply with the requirements specified in 3.5.1.1 through 3.5.1.6.

3.5.1.1 Width—The roll width (web size) is normally related to the printing presses. The USPS will consider size of web per provided layout, or 20- to 36-inch web sizes. This parameter will be defined at the time of finalization of the solicitation.

3.5.1.2 Diameter—The maximum roll diameter can be determined in two ways. One is dependent on the press limitation and the other is dependent on length of the paper ranging from 17,000 feet to 25,000 feet. This parameter will be defined at the time of finalization of the solicitation.

3.5.1.3 Wind—The liner side of the "sandwich" is to be wound IN.

3.5.1.4 Core Diameter—The inside diameter of core shall be between 76.2 mm (3 inches) and 77.0 mm (3.03 inches). The outside diameter of the core shall be between 98.5 mm (3.88 inches) and 105.4 mm (4.1 inches).

3.5.1.5 Splices—All splices shall be lap splices, made on a diagonal 5° to 25° from the cross direction of the paper. The leading and trailing edges shall be secured by using a minimum of 2-inch wide heat-resistant tape. The tape color shall contrast with the paper color. Splices shall not separate or cause press breaks during printing nor shall they damage the press rolls or interfere with subsequent processing. There shall be a minimum of 760 meters (2500 feet) between adjacent splices, and no splice shall be within 760 meters (2500 feet) of the beginning or end of a roll. All splices shall be marked with red flags or markers on both ends of the roll. The markers shall not affect the performance or appearance of the paper.

3.5.1.5.1 Number of Splices—An individual roll shall not exceed two splices per roll. The average splices per roll, per shipment shall not exceed one.

3.5.1.6 Roll Defects—The rolls shall be free from scraps, slitting residue, and other extraneous materials. The "sandwich" shall be free from slime holes, ridges, wrinkles, creases, and calender cuts. The rolls shall be free from baggy webs. All cores shall be straight and round. Notches and ends shall be clean and evenly cut. Cores shall not extend more than ⅛ inch from either end of a roll. Cores shall not be recessed more than ¼ inch from either end of a roll.

3.5.2 Nameplates or Product Markings 3.5.2.1 Roll Identification—All rolls shall carry identification on the side of the roll (roll number, width, and order number) and on the core ticket (order number, operator's initials, number of splices, width and roll number).

3.6 Workmanship 3.6.1 Cleanliness—The face stock and the release liner backing shall be free from defects, such as holes, spots, dust and extraneous debris, etc., when examined visually per TAPPI T 437.

3.6.1.1 Print Surface—Print surface defects are defined as any visible flaw, and any speck, dirt, or other spot or discoloration having an equivalent area greater than 0.30 mm using the Dirt Estimation Chart in TAPPI T 437. The print surface shall be free from lint, slitter dust, loose coating, loose adhesive and other debris. The test shall be conducted per 4.6.2.1. g.

4. Quality Assurance Provisions 4.1 Responsibility for Inspection—Unless otherwise specified in the contract or purchase order, the contractor shall be responsible for the performance of all inspection requirements as specified herein. Inspections and Quality Assurance procedures shall comply with USPS-STD-22 and with Postage Stamp Quality Assurance Requirements. Except as otherwise specified in the contract or purchase order, the contractor may use his/her own or any other facilities suitable for the performance of the inspection requirements specified herein. The USPS reserves the right to perform any of the inspections set forth in the specification and/or solicitation where such inspections are deemed necessary to assure supplies and services conform to prescribed requirements.

4.1.1 Contractor Quality Assurance Plan—The contractor shall develop and institute a quality assurance plan in accordance with the USPS-STD-22. This quality assurance plan shall ensure that the product delivered to the USPS meets the requirements specified herein. Prospective contractors shall include a copy of this plan as part of their proposal.

4.2 Classification of Inspections—The examination and inspection requirements specified herein are classified as follows:

a. Contractor and USPS First Article Inspection (see 4.3)

b. Contractor Quality Conformance Inspection (see 4.4)

c. USPS Receiving Inspection (see 4.5)

4.3 First Article Inspection 4.3.1 Contractor inspection—The contractor shall perform examination and tests in accordance with 4.6.1 and 4.6.2.

4.3.2 USPS Inspection—Upon completion of the contractor first article inspection, the contractor shall furnish the complete test results, recorded on Inspection Sheets, and a minimum of 50 8½ by 11-inch sheets each of the face stock, the liner and the "sandwich" to the U.S. Postal Service, Test and Evaluation, 8403 Lee Highway, Merrifield, Va. 22082-8101. The paper shall be inspected in accordance with the examination and testing requirements of this specification. Presence of critical or major defects shall be cause for rejection. The USPS reserves the right to cease inspection at such time as a critical or major defect is identified. The USPS will retain the test results and the samples.

4.4 Contractor Quality Conformance Inspection—Before shipment of a lot, the contractor shall select the samples in accordance with ANSI/ASQC Z1.4 and/or TAPPI T 400 or equivalent. The sampling plan and the basis for acceptance or rejection shall be that set forth in Appendices A, B, and C of TAPPI T 400. The lot size shall be expressed in units of rolls. These samples shall be examined and tested in accordance with the procedures of 4.6.1 and 4.6.2. Results of the contractor quality conformance inspection shall be recorded on the Inspection Sheets. The completed Inspection Sheets shall be furnished to the USPS upon delivery of each lot to the USPS receiving facility. A comparison will be made between the results of the Inspection Sheets and the receiving inspection as conducted in 4.5. Presence of one or more discrepancies in the inspection Sheets or defects detected in the receiving inspection shall be cause for rejection of the lot. The USPS reserves the right to conduct quality conformance inspection(s) at the contractor's production facility. The USPS Quality Conformance Inspection shall not be in lieu of the contractor Quality Conformance Inspection. The results of the USPS Quality Conformance Inspection will take precedence over the results of the contractor or Quality Conformance Inspection.

4.4.1 Inspection Sheets—The contractor shall furnish to the USPS receiving facility copies of the Inspection Sheets with each lot.

4.5 USPS Receiving Inspection—With each delivery of a lot to a USPS facility, the contractor shall provide the USPS with copies of the completed Inspection Sheets (see Attachment A). The USPS will review the Inspection Sheets and randomly select samples from the lot and examine them for the defects listed in 4.6.1. Presence of one or more defects shall be cause for rejection of the lot.

4.6 Inspection Procedure 4.6.1 Examination Procedure—Contract and lot numbers and results from the examination shall be recorded on the inspection sheets. The "sandwich" and/or its components shall be examined for the following defects as categorized below:

| Critical | | |
|---|---|---|
| 1. | Basis weight of: | |
| | (a) The face stock not as specified. | |
| | (b) The release liner not as specified. | |
| 2. | Phosphorescence and red fluorescence (luminescence) not as specified. | |
| 3. | Smoothness not as specified. | |
| 4. | Curl of the "sandwich" not as specified. | |
| 5. | Water removability of the adhesive not as specified. | |
| 6. | Permanence of the adhesive not as specified. | |
| 7. | Printability of the liner not as specified. | |
| 8. | Packaging, packing and marking not as specified. | |
| 9. | Face stock coating not as specified. | |
| Major | | |
| 101. | Physical (strength properties not as specified). | |
| 102. | Opacity of: | |
| | (a) The face stock not as specified. | |
| | (b) The release liner not as specified. | |
| 103. | Ink cancellation not as specified. | |
| 104. | Brightness of: | |
| | (a) The face stock not as specified. | |
| | (b) The release liner not as specified. | |
| 105. | Cracking not as specified. | |
| Minor | | |
| 201. | Color of: | |
| | (a) The face stock not as specified. | |
| | (b) The release liner not as specified. | |
| 202. | Aging of: | |
| | (a) The face stock not as specified. | |
| | (b) The pressure sensitive adhesive not as specified. | |
| 203. | Cleanliness not as specified. | |
| 204. | Surface acidity not as specified. | |

4.6.2 Test Procedures—Tests shall be performed in accordance with the following methods. Reference to specific instruments is for information only; use of a company and/or product name in this document does not imply approval or recommendation of the product in preference to others that may also be suitable. Unless otherwise specified in the test method, all tests shall be conducted in the conditioned chamber or room at standard conditions per TAPPI T 402.

4.6.2.1 Face Stock—Tests for face stock shall be as specified in Table I. Those tests that cannot be easily listed in the table or that otherwise require explanation shall be as specified in 4.6.2.1a through 4.6.2.1 g.

a. Compressibility—The paper compressibility test shall be conducted per TAPPI T 460, except the time shall be measured for a 100 ml air leakage between the paper surface and the metal plate having the bosses with a pressure of 2 pound weight.

b. Color—The color of the face stock shall be determined instrumentally in accordance with the procedures specified in ASTM D 2244, and shall be expressed in CIE L* a* b* Uniform Color Coordinates. The L*, a*, and b* shall be calculated from reflectance data taken under illuminant D65 (D-650010, with specular reflection excluded. Measurements shall be taken on samples backed by a stack of the same material. The stack shall be thick enough so that doubling the thickness does not affect the reflectance readings. The USPS measures color using an instrument having a 6 inch, 8° integrating sphere, Illuminant D65, a standard 10° observer, specular reflection excluded, and an aperture of 22 mm (0.9 inches) diameter.

c. K&N Ink Absorption—The absorptivity of paper is found using a simple procedure with K&N test ink. An excess of this ink is applied to one or more samples of the paper. The ink is allowed to stand on the paper for two minutes and is then thoroughly wiped off. The intensity of the ink stain that remains on the sample is then measured with a reflection densitometer. K&N test ink is available from the K&N laboratories, P.O. Box 7226, Deerfield, Ill. 60015 Tel (312) 482-3240.

d. Red Fluorescence—The red Fluorescence shall be measured with a USPS Luminescence Meter (see Appendix I, Section 40).

e. Phosphorescence—The paper phosphorescence shall be measured with a USPS Luminescence Meter per USPS test method (see Appendix I, Section 40). The phosphorescent pigment, when excited by ultraviolet light at a peak wavelength of 254 nanometers, shall phosphoresce in the visible (green) region of the spectrum with a peak emission at a wavelength of 526 nanometers. The average particle size of the pigment used shall be 1.9 microns. The luminescence properties shall conform to the values given in Table I (item numbers 21 and 22).

f. Cancellation—This test evaluates the acceptance of the USPS 914M23B cancellation ink, and thus the cancellation quality, of the finished stamp. The test shall be conducted per USPS test method, Appendix I, Section 20.

g. Cleanliness—A sample area of at least 0.93 m² (10 ft2) shall be examined visually for the defects listed in 3.6.1.1. Defect sizes shall be determined by direct visual comparison to the Dirt Estimation Chart in TAPPI T 437. Defects larger than the limits listed in Table I shall be counted, and total defect area per square foot shall be calculated. (Report both the average defect count per square foot and average defect area per square foot.)

4.6.2.2 Release Liner Backing—Tests for release liner backing shall be as specified in Table II. Those test that cannot be easily listed in table shall be as specified in 4.6.2.2.a and 4.6.2.2.b a. Color—The color of the release liner shall be determined instrumentally in accordance with the procedures specified in ASTM D 2244, and shall be expressed in CIE L* a* b* Uniform Color Coordinates. See also section 4.6.2.1b.

b. Printing—The liner shall be printed only if specified in the contract. For sheetlets, the outside of the liner shall be capable of reproducing a 175-line screen of good quality when printed by gravure, offset, or flexo methods. For coils, the outside of the liner shall be capable of reproducing a 100/120-line screen. However, both sides of the liner shall be printable.

4.6.2.3 PSA—The following tests shall be performed on the PSA. Test results shall be those specified in Table III under specification and classification.

a. Peel Adhesion (90°)—Face Stock—The peel adhesion (90°)—Face Stock test shall be conducted per USPS test method, Appendix II, Section 40.

b. Peel Adhesion (90°)—Release Liner—The peel adhesion (90°)—release liner test shall be conducted per USPS test method, Appendix II, Section 30.

c. Water Removability—The water removability test shall be conducted per USPS test method, Appendix II, Section 50.

d. Accelerated Aging—The accelerated aging test shall be conducted per USPS test method, Appendix II, Section 60.

e. Permanence—The permanence test shall be conducted per USPS test method, Appendix II, Section 70.

5. Preparation for Delivery 5.1 Preservation, Packaging, and Packing—Preservation, packaging, and packing shall be as specified in the contract. Markings shall be in accordance with FED-STD-123.

5.1.1 Roll Wrapping—Each roll shall have wooden, metal or plastic plugs inserted in each end of the core prior to shipment, that will prevent collapse of the core during handling. Each roll shall have a waterproof header placed over each end to completely cover the ends and edges. Each roll shall then be well wrapped in moisture proof paper or plastic film to prevent damage and exposure to dirt and moisture.

5.1.2 Skids—The rolls shall be delivered on skids. The number of rolls per skid shall be three or four.

5.1.3 Alternate Methods—The contractor may request authorization for alternate methods of packaging from an appointed COR, prior to the shipment of any rolls.

5.1.4 Wrapper Marking—The wrapper on each roll shall be legibly marked on opposite sides with the following.

a. Self Adhesive Stamp Paper Type I/Type II/Type III
b. Net Weight
c. Number of linear feet
d. Number of splices in the roll
e. Serial number that will indicate the lot and roll number
f. Purchase order number
g. Contractors name All rolls shall be numbered in sequence for the entire contract.

6. NOTES 6.1 Intended Use—The paper covered by this specification is intended to be used in the production of postage stamps.

6.2 Ordering Data—Procurement documents shall specify the following information:

a. Title, number, and date of this specification
b. Type and quantity required
c. City, state, and street address for destination of each shipment
d. Preservation, packaging, and packing when other than that specified in 5.1
e. City, State, and Street address for delivery of samples
f. Time frame for submission of the first article (see 3.2)

6.3 Definitions 6.3.1 Accelerated Aging—This method describes a procedure to predict the potential life of PSA-based stamp paper under accelerated aging processes, i.e. heating, cooling and high humidity. The test is aimed to duplicate the results, in a short time, of what may otherwise take a long time in an actual service condition. The potential shelf-life of PSA stamp paper is determined by the degree of degradation of the adhesive and changes in physical properties as a result of its exposure to the accelerated environmental conditions over a period of time.

6.3.2 Curl—Curl is the tendency of paper by itself or in a laminate to bend or partly wrap around the axis of one of its directions.

6.3.3 Drying Time—Drying time is the time required for standard USPS cancellation ink to dry without showing smudging or smearing when the cancellation ink is rubbed with a rubber-tipped glass rod.

6.3.4 Face Stock—The face stock is perhaps the most important component of a pressure-sensitive construction. It carries the printing or electronic imaging and adhesive coating and becomes the applied stamp.

6.3.5 Flagging—Flagging is a term to describe the lifting of the terminating end of a PSA label. The knowledge of this property is useful in determining whether such properties as thickness, stiffness, and adhesion have been properly balanced for applications where flagging may occur.

6.3.6 Leggy—The term "leggy", as used in this specification, describes the presence of excess adhesive that forms in strands to connect face stock and release liner of PSA stamp paper upon separation of the face stock from the release liner.

6.3.7 Migration—Migration is the movement of one or more of the components of a PSA to either a substrate or face material; or, the movement of one or more of the components of either or both the face material and the substrate into the adhesive or ink.

6.3.8 Oozing—Oozing is a "squeezing out" of the adhesive from under the backing. If this occurs when the tape is in the roll form, the edges of the roll become tacky.

6.3.9 Peel Adhesion—Peel adhesion is defined as the force required to remove the release liner from a base stock at a required angle, at a specified speed, and under specified conditions of temperature and relative humidity.

6.3.10 Peeling—Peeling is the force required to break the bond between label and the surface to which it is applied. A fiber tear is an indication of peeling.

6.3.11 Penetration (Bleed Through)—Penetration is the change of appearance of the face material due to movement of one or more of the components from the adhesive or the substrate.

6.3.12 Permanence—A stamp is considered permanent if the bond to the substrate(s) makes removal difficult or impossible without distorting the face stock or damaging the substrate. There shall be visible evidence of fiber tear to the stamp and/or to the surface to which it was applied within 10–30 seconds of application when observed under naked eye without any magnifying aid.

6.3.13 Pressure Sensitive Adhesive (PSA)—PSA is a common term used to designate a distinct category of adhesive paper and adhesive that in dry (solvent-free) form are aggressively and permanently tacky at room temperature. This type of adhesive firmly adheres to a variety of dissimilar surfaces upon mere contact without the need of more than finger or hand pressure.

6.3.14 Recyclable—Recyclables are waste materials that are collected, separated or processed and used as raw-materials or products.

6.3.15 Recycling—Recycling is defined as the activities by which materials, that would otherwise remain waste, are collected, separated, or processed and used in the form of raw materials. Recycling may be further defined by type: primary, secondary, or tertiary. Primary recycling is remaking the recyclable material into the same material in a process that can be repeated a number of times (e.g. newspaper into newspaper). Secondary recycling is remaking the recyclable material into a material that has the potential to be recycled again (e.g. newspaper into recycled paperboard). Tertiary recycling is remaking the recyclable material into a product that is unlikely to be recycled again (e.g. glass into glassphalt, paper into tissue paper).

6.3.16 Release Coating—The release coating is a type of coating which will not only release from the adhesive well, but will also, in a linerless pressure-sensitive construction, accept the USPS cancellation ink and allow for the luminescence of the taggant.

6.3.17 Standard Conditions—As used in this specification, standard conditions are a temperature of 73°±2° F. and a relative humidity of 50 percent ±2 percent. Unless otherwise specified in the test method, all tests shall be conducted in the conditioned chamber or room at standard conditions.

6.3.18 Tack—Tack is defined as that property of an adhesive system that causes it to wet and form a bond of suitable strength with the application of only very slight pressure.

6.3.19 Water Removability—Water removability determines the length of time required to separate a stamp(s) from the substrate(s) to which it is affixed. The possibility of blocking is also a concern and is based on the solubility of the adhesive in water and whether the adhesive remains on the stamp or the substrate.

Appendix I

USPS Tests Methods for Paper Testing

10. Needle Penetration Test (ABRASION)—This test determines the abrasiveness of paper. The test shall be conducted per the Institute of Paper Chemistry (IPC) Needle Test and as specified herein.

10.1 Equipment
   a. Modified Brother Sewing Machine with bobbin apparatus removed, five digit counter attached, and pressure foot and plate holes filed to make them larger.
   b. Bronze test needles made by Baumiller Machine Co., P.O. Box 11, Glen Avenue and Junior Streets, Glen Rock, Pa., (717) 235-5449
   c. Cahn Microbalance C31. (Model #10931-01 and Serial #75634)

10.2 Sample Preparation—A stack of sheets weighing approximately 600 $g/m^2$ is required. The number of sheets per sample is determined by the basis weight. If the basis weight of a sample is 91.8 g/m2, then a stack of seven sheets would give a total weight of 642.6 $g/m^2$. The size of the paper is determined by the area needed to make 10,000 perforations and the stitch space setting on the sewing machine. Two or more sets of the same sample can be used as long as the same number of sheets per stack are used.

10.3 Procedure
   a. Clean needle with acetone.
   b. Using a pair of tweezers, place the needle in the micro balance and weigh to the nearest 0.01 mg. Record weight. Take the needle out of the balance with the tweezers and clamp in needle holder on sewing machine.
   c. Place sample under sewing machine pressure foot and reset counter to zero. Make 10,000 perforations in paper sample.

d. Remove needle and rinse with acetone. Weigh needle again to the nearest 0.01 mg. Subtract final weight from the initial weight to determine the weight loss of the needle in mg. Convert mg to mmg by dividing by 1000. Record results in mmg.

20. Cancellation Ink Drying Time—This test evaluates the acceptance of the USPS 914M23B cancellation ink by the finished stamp and thus the cancellation quality.

20.1 Equipment
   a. Rubber tipped glass rod
   b. Stop watch
   c. Stamp pad, test mail rubber stamp, and cancellation ink (914M23B)
   d. Stamped envelopes 20.2 Sample Preparation
   a. Fill stamp pad with cancellation ink the day before you perform the test.
   b. Place a stamp on the upper right corner of an envelope. Make more than five samples.
   c. Load the test mail rubber stamp with cancellation ink from the stamp pad (by pressing the rubber stamp against the inked stamp pad.)

20.3 Testing
   a. Perform trial cancellations on bond paper and/or some of the samples to attain a good cancellation mark. A good cancellation has all of the indicia present, and killer bars complete.
   b. Stamp cancellation marks on samples.
   c. Determine cancellation drying time by rubbing the rubber tipped glass rod across the ink (indicia) on the stamp at regular time intervals (e.g., every 15 seconds for the first two minutes and every 30 seconds for the next three minutes, etc.) until dry. Increase or decrease the time interval as necessary.
   d. When the cancellation mark is totally dry (no ink smear or no ink transfer when touched with finger tip), record time. A good cancellation on a stamp should dry within five minutes.

20.4 Results—The results of the five measurements on each sample shall be averaged and reported in minutes.

30. Parker Print-Surf (PPS) Roughness of Stamp Papers—This test determines the roughness of postage stamp paper using the PPS Paper Roughness Tester (Model #PPS 78)

30.1 Equipment
   a. PPS Tester Model #PPS 78
   b. Clamp Pressure—5 kgf/cm$^2$
   c. Backing—Standard soft backing (neoprene litho rubber backing)

30.2 Samole Preparation—Five samples shall be prepared for each type of paper being tested. The samples shall be cut into 15 by 15 cm squares and conditioned for 24 hours at 73°±2° F. and 50 percent ±2 percent RH.

30.3 Calibration
   a. Allow the instrument to warm up for a period of 45 minutes prior to testing. With the function indicator lamp on, press test Button 1 and observe that the display reads 1000 and the indicator lamp which reads "set to 1000" at the 20 kgf/cm$^2$ position is illuminated. Refer to the instrument manual if the display does not read 1000.
   b. Repeat the procedure for the 10 and 5 kgf/cm$^2$ clamp pressure positions and the head pressure position. The digital display should read 1000 for each position. If not, the display will flash, indicating an adjustment to a pressure or pressures should be made.

30.4 Measurement—Make five measurements on each sample sheet, one measurement at each corner and one measurement in the middle. Measurements for all five samples shall be made at one sitting so that small variations caused by calibration, air flow, and operator idiosyncrasies may be minimized.

30.5 Results 30.5.1 Averaging—The results of the five measurements on each sample shall be averaged and reported in microns (mmm).

30.5.2 Reporting—The report of analysis shall include complete sample identification: paper type, roll number, roughness, and parameters used. For each paper sampled, the average value and the standard deviation shall be reported.

40. PMU Measurement on Stamp Paper—This test determines the green phosphorescence and the red fluorescence of the paper using the Model 2C Luminescence Meter. The Model 2C Luminescence Meter is the most recent instrument developed by the USPS for the measurement of green phosphorescence, red phosphorescence, and red fluorescence. The instrument is of the self-calibrating type.

40.1 Equipment
   a. Luminescence Meter Model LM-2C 40.2 Procedure
   a. Turn on the instrument using the switch on back and let it warm up for at least 15 to 20 minutes.
   b. The window will display "CLD" when it is turned on. This shows that it is undergoing self-calibration.
   c. When the display shows "RDY", the instrument is ready for measurement.
   d. Measure the green phosphor reading by placing the paper sample between the measuring window and the lever arm. Press on the lever arm and record the highest reading possible for that sample.
   e. The results are repetitive. Make at least 10 such observations on the paper sample. Report both the average and variation, i.e., minimum/maximum.

Note 1: When the instrument is on, it calibrates automatically every few minutes. Measurement shall be done only when the meter shows "RDY".

Note 2: The instrument is capable of making the measurement of phosphorescence intensity only up to 200 PMU. However, the Test and Evaluation Division of the USPS has determined that by masking the window in "half" the reading obtained, if multiplied by 1.75, will give the exact phosphorescence intensity of the paper. This has been found to be true over the entire or total range of luminescence. However, it is very important that the window is masked exactly in half.

Note 3: The Bureau of Engraving and Printing has developed a new method for reading PMU's in excess of 200. It involves the use of Neutral Density Screen which is both practical and easy to use. However, it is important that the measurements are made rounded-side down (i.e., flat surface facing the paper). The multiplication factor is 2.39 and holds true for the entire range of luminescence.

Note 4: The Neutral Density Screens are prepared from commercially available 20-gauge perforated stainless steel stock. The screen has 3.196 mm (1.165 in.) perforations and 63 percent open area. The screen size is approximately 5 by 5 cm.

Note 5: The perforated stainless steel may be obtained from McMaster-Carr, P.O. Box 440, New Brunswick, N.J. 08903-0440, Telephone (201) 329-3200. Please be advised that this information is provided for information purposes only. It does not imply approval or recommendation of a product in preference to others that may also be available.

Appendix II

USPS Test Methods for PSA Testing

10. Applicable Documents 10.1 Non Government Documents—The following documents of the issue in effect on date of invitation for bids or request for proposal from a part of this specification to the extent specified herein:

Specifications

American Society for Testing and Materials

ASTM A 666 Austentic Stainless Steel Sheet, Strip, Plate and Flat Bar

20. Preparation for Testing 20.1 Cleaning of Test Surfaces—When the tests of this appendix require cleaning of test surfaces or panels, such cleaning shall be as specified in 20.1.1 through 20.1.3.

20.1.1 Scrubbing or Wiping Materials (Surgical Gauze or Tissue)—To be suitable, the gauze or tissue must be lint-free during use, absorbent, contain no additives which are soluble in the solvents listed in paragraph 20.1.2, and be made exclusively from virgin materials.

20.1.2 Solvents a. Diacetone alcohol, non-residual, technical grade or better b. Reagent grade of one of the following: Normal heptane (n-heptane) Methyl alcohol (95 percent)

20.1.3 Procedure a. Dispense Diacetone alcohol onto the panel. Scrub the panel with a clean piece of absorbent cleaning material (20.1.1). Dry the panel with a fresh absorbent cleaning material(20.1.1). Dispense one of the solvents listed in 20.1.2, onto the panel, wiping it to dryness with fresh absorbent cleaning material. Repeat for a total of three washes with this solvent.

b. Discard cleaned panels showing stains, discoloration, or numerous scratches.

c. Avoid contacting panel surface with fingers.

d. During storage, panels should be protected from damage by covering with protective tape.

20.2 Conditioning of Sample Rolls—Unless otherwise specified, the sample roll(s) shall be conditioned for at least 24 hours prior to testing in an atmosphere maintained at standard conditions (6.3.17). The sample roll shall be placed in the chamber or room in such a way that the conditioning atmosphere shall have free access to all normally exposed surfaces of the sample roll.

20.3 Selection of Samples (Test Specimens)

a. Discard at least three outer wraps of paper from the sample roll before taking specimens for testing. This applies to rolls in the as-received and accelerated-aged condition.

b. Unless otherwise specified, remove one specimen per sample roll for each test to be performed. Remove it from a freely rotating roll at the rate of 20 to 30 inches per second. Where width or other factor causing a high adherence to backing makes it impossible to remove the specimen at the prescribed rate, remove it at a rate as close to 20 inches per second as possible.

c. When the tape is wider than the dimension specified in the method, specimens of the widest specified width are to be cut from the center of a strip removed from the roll as in 20.3.b.

30. Peel Adhesion (90°)—Face Stock from Release Liner—This test measures the force required to remove the facestock coated with PSA, from a release liner, at a specified angle (90°), a specified speed (300 inches [7.5 m] per minute), and under specified conditions of temperature (73°±2° F. [23°±1° C.]) and relative humidity (50 percent ±2 percent).

30.1 Test Specimen Size—The specimen shall be 2 inches (5.1 cm) wide and a minimum of 6 inches (15.2 cm) long.

30.2 Preparation and Test Conditions—Unless otherwise specified, the specimen shall be conditioned for 24 hours at 73°±2° F. (23°±1° C.) and at a relative humidity of 50 percent ±2 percent, and then tested under the same conditions.

30.3 Equipment—The following equipment is required for this test:

a. TLMI Release and Adhesion Tester b. Steel test panel:
Panel—A steel panel 2- by 5- by $\frac{1}{16}$-inch (5- by 12.5- by 0.4-cm) having a bright annealed finish shall be used. The steel shall conform to ASTM A 666, Type 302 or 304 (AISI No. 302 and No. 304). The surface roughness height shall be 2.0 microinches ±1.0 microinches arithmetical average deviation from the mean line. Panel shall be free of scratches, stains, and discoloration.

c. Roller, Rubber-Covered:
A steel roller, 3.25±0.1 inches (8.1±0.3 cm) in diameter and 1.75±0.05 inches (4.4±1.3 cm) in width, covered with rubber approximately 0.25 inch (0.6 cm) thick and having a shore scale A durometer hardness of 75 to 85. The cylindrical surface of the roller shall be a true surface void of any concave or convex deviations so that the roller will apply uniform pressure across the width of its entire surface. The weight of the roller proper, which applies pressure to the specimen, shall be 4.5±0.1 lb (2.0±0.05 kg).

30.4 Procedure a. Apply a strip of two-sided, coated tape, as wide as the specimen (2 inches [5.1 cm]) and the full length of the test panel.

b. Apply the specimen, complete with liner side down, against the strip of tape, leaving 1 inch (2.5 cm) of the specimen extending past the test surface.

c. Pass the roller twice, once in each direction, over the specimen to adhere the specimen to the tape.

d. Peel back the 1 inch (2.5 cm) portion of the face stock extending past the testing surface, leaving the liner portion of the material exposed and fold the adhesive part back against itself.

e. Allow a 10 minute dwell time between application of the specimen to the test panel and the actual test.

f. Start the machine operating at a speed of 300 inches (7.5 m) per minute.

30.5 Report a. Repeat the above test procedure on five specimens and average the results obtained. Include the minimum and maximum readings on each test. Report the results in grams per 2 inches.

40. Peel Adhesion (90°)—Face Stock from Test Panel—This test measures the force required to remove the pressure-sensitive material from a specified test panel, at a specified angle (90°), a specified speed (12 inches [30.5 cm] per minute), and under specified conditions of temperature (73°±2° F. [23°±1° C.]) and relative humidity (50 percent i2 percent).

40.1 Test Specimen Size—The specimen shall be 1 inch (2.5 cm) wide and a minimum of 6 inches (15.2 cm) long.

40.2 Preparation and Test Conditions—The specimen shall be conditioned for 24 hours at 73°±2° F. (23°±1° C.) and a relative humidity of 50 percent ±2 percent, and then under the same conditions, unless otherwise specified.

40.3 Equipment
- a. TLMI Release and Adhesion Tester
- b. Steel test panel (see 30.3.b for description)
- c. A 4.5 lb (1.7 kg) rubber-covered roller (see 30.3.c for description).

40.4 Procedure
- a. Apply the specimen, adhesive side down, to the clean test panel leaving 1 inch (2.5 cm) of the 6-inch (15.2 cm) specimen extending past the test surface.
- b. Pass the roller twice, once in each direction, over the specimen. Discard any specimens that have air bubbles after being rolled and prepare new specimens. Prepare each specimen individually and allow a dwell time of 10 minutes.
- c. Fold the adhesive part back, against itself, and clamp into the tester.
- d. Start the machine operating at a speed of 12 inches (30.5 cm) per minute.

40.5 Report
- a. Repeat the above test procedure on five specimens and average the results obtained. Include the minimum and maximum readings on each test Report the results in pounds per inch (grams per cm).

50. Water Removability—This test measures the length of time required to separate stamp(s) from the substrate(s) to which they are affixed. The possibility of blocking is also noted, based on the solubility of the adhesive in water or whether the adhesive remains on the stamp or on the substrate.

50.1 Equipment
- a. An 8- by 8- by 2-inch dish or similar utensil suitable for soaking the appropriate amount of test specimens.
- b. Adequate amount of water to ensure submersion of test specimens.
- c. Envelope substrates—wove paper, regular kraft, and bond paper.
- d. Conventional stamps, approximately one per test specimen. Including conventional stamps in this test should indicate any unforeseen problems with different types of adhesive.
- e. Timer or stop watch.

50.2 Procedure
- a. Affix pressure-sensitive stamps to the different substrates at least 2 hours prior to testing.
- b. Submerge test specimens in water along with conventional stamps and allow to soak for 5-, 10-, 20-, and 30-minute intervals.
- c. At the end of each time interval, remove test specimens from water and separate, if necessary, from substrates.

50.3 Test Results—Note the maximum time required to separate stamp from substrate. In terms of blocking, rate each test specimen based on the following guidelines for adhesive properties for each time interval:
1. adhesive dissolves
2. stamp separates with adhesive on substrate
3. stamp separates with adhesive on the stamp itself
4. separates with little fiber tear
5. separates with fiber tear, stamp is destroyed, etc.

Note: The lower the averaged number, the better the stamp adhesive is as far as preventing any blocking.

60. Accelerated Aging—This test verifies the stability and establishes the potential shelf life of the adhesive coating by exposing samples to high and low temperatures and high humidity and monitoring the physical appearance of the coating.

60.1 Equipment
- a. Laboratory chamber or oven with air circulation capability at 70°±1° C. (158°±2° F.).
- b. Humidity chamber with air circulation capability at 38°±1° C. (100°±2° F.) and 90 percent relative humidity.
- c. Adequate quantities of substrate samples, i.e., white wove, bond, and regular Kraft.

60.2 Test Samples—The test samples consist of forty-five, stamp-size labels, measuring 1- by 1½ inch, on a liner and three 8½ by 11-inch sheets of the "sandwich" stock. Fifteen labels are applied to each of the three substrates, and five envelopes from each of the three substrate groups are exposed to the environmental conditions described below. Each of the three exposure groups will also contain one 8½ by 11-inch sheet.

60.3 Test Procedure
- a. One group (i.e., 8½ by 11-inch sheet and five label-bearing envelopes of each of the three substrates) shall be subjected to high temperature of 70°±1° C. (158°±2° F.) for 42 days.
- b. Another group (i.e., as described above in 70.3.a) shall be subjected to a low temperature of −40°±1° C. (−40°±2° F.) for 42 days.
- c. The remaining group (i.e., as described above in 70.3.a) shall be subjected to conditions of 38°±1° C. (100°±2° F.) and a relative humidity of 90 percent for 42 days.
- d. Each group shall be removed from the anvil chamber and inspected at intervals of 4 hours, 24 hours, 7 days, 10 days, 15 days, 21 days and 42 days.
- e. Any visible evidence of the following properties listed below (as defined in 6.3) at each of the intervals shall be recorded. Visible evidence of any of these shall constitute failure of this test:
  (i) migration
  (ii) penetration
  (iii) curling
  (iv) oozing
  (v) flagging
  (vi) peeling 70. Permanence—This test measures the permanent characteristics of a pressure-sensitive stamp on several substrates. See section 6.3.12 for definition.

70.1 Equipment
- a. Envelope substrate—wove paper, regular kraft, bond paper, and recycled content papers (generic—as available)
- b. Timer or stop watch 70.2 Test Procedure
- a. Place test specimen (pressure-sensitive stamp) onto substrate applying pressure as if affixing the stamp to substrate.
- b. After 10 seconds, pull off stamp and check for fiber tear.
- c. If there is no fiber tear, repeat procedures (a) and (b) with new specimen for 30 seconds, 1 minute, 5 minutes, and 15 minutes, and make observation for fiber tear. There shall be visible evidence of fiber tear to the stamp and/or to the substrate to which it was applied when observed under naked eye without any magnifying aid.

d. Record results in seconds/minutes at which fiber tear was observed. The lower the recorded time, the better the degree of permanence.

e. Lack of fiber tear within 5 minutes shall be considered adhesive failure, not meeting the requirements of Table III, item no 5 for permanence property.

Attachment A

INSPECTION SHEET

INSTRUCTIONS: This inspection sheet shall be used for the contractor's first article inspection in accordance with 4.3.1 of this specification. After completing 4.6.1 and 4.6.2 of this specification, record the number of satisfactory samples (# SAT) meeting all specification requirements of that item and the number of unsatisfactory samples (# UNSAT) failing to meet all requirements of that item. Record conclusions, sign, and date.

CONTRACT NO:_____  LOT NO:_____  CONTRACTOR NAME:_____

| EXAMINING RESULT (see 4.6.1) | # SAT | # UNSAT |
|---|---|---|
| 1. Basis weight (4.6.1 #1) | | |
| (a) Face Stock | | |
| (b) Release liner | | |
| 2. Luminescence (4.6.1 #2) | | |
| (a) Phosphorescence | | |
| (b) Red Flourescence | | |
| 3. Smoothness (4.6.1 #3) | | |
| (a) Sheffield | | |
| (b) Parker Print Surf Roughness Curl (4.6.1 #4) | | |
| 4. Curl (4.6.1 #4) | | |
| 5. Water Removability (4.6.1 #5) | | |
| 6. Permanence (4.6.1 #6) | | |
| 7. Printability (4.6.1 #7) | | |
| 8. Packaging, Packing & Marketing (4.6.1 #8) | | |
| 9. Face Stock coating (4.6.1 #9) | | |
| 10. Physical (4.6.1 #101) | | |
| (a) Fiber content | | |
| (b) Ash | | |
| (c) Internal bond | | |

| | # SAT | # UNSAT |
|---|---|---|
| 11. Opacity (4.6.1 #102) | | |
| (a) Face stock | | |
| (b) Release liner | | |
| 12. Cancellation (4.6.1 #103) | | |
| 13. Brightness (4.6.1 #104) | | |
| (a) Face stock | | |
| (b) Release liner | | |
| 14. Cracking (4.6.1 #105) | | |
| 15. Color (4.6.1 #201) | | |
| (a) Face stock | | |
| (b) Release liner | | |
| 16. Aging (4.6.1 #202) | | |
| (a) Face stock | | |
| (b) Pressure sensitive adhesive | | |
| 17. Cleanliness (4.6.1 #203) | | |
| 18. Surface Acidity (4.6.1 #204) | | |

TEST RESULTS: (see 4.6.2)

| Target | |
|---|---|
| Caliper | _____ |
| Formation | _____ |
| Dry Tensile | _____ |
|   (a) MD | _____ |
|   (b) CD | _____ |
| Tear | _____ |
| K & N Ink absorption | _____ |
| Gloss -75° | _____ |
| Moisture | _____ |
| Peel adhesion | _____ |
|   (a) Face stock | _____ |
|   (b) Release liner | _____ |
| Monitor | |
| Compressibility | _____ |
| Stiffness (Taber) | _____ |
| Abrasion | _____ |
| Tack (rolling ball method) | _____ |

Conclusions:
  Inspection Conclusion (recommendations for acceptance or nonacceptance)
_____

Signing Authority: _____

---

Attachment B
QUALIFIED PRODUCTS LIST (QPL)

The pressure sensitive adhesive (PSA) suppliers/converters and stamp paper (face stock) manufacturers listed below have formally demonstrated their ability to produce PSA "sandwich" that is in compliance with USPS-P-12378C. Procurement of face stock and PSA from sources other than those listed is not authorized for PSA based stamps produced under contract or Interagency Agreement with the United States Postal Service.

APPROVED MANUFACTURERS

| PRESSURE SENSITIVE ADHESIVE | STAMP PAPER (FACE STOCK) |
|---|---|
| 1. 3M | 1. COATED PAPER LIMITED |
| 2. FASSON | 2. P. H. GLATFELTER CO. |
| 3. NICHEMEN/KANZAKi | 3. WESTVACO |
| 4. UNITES STATES PAPER CORP/ BROWN-BRIDGE INDUSTRIES, INC. | |

The order in which companies name are listed is not a ranking.
A point of contact for each organization is provided below:

| 3M | Fasson | P. H. Glatfelter Company |
|---|---|---|
| Paul R. LaBrosse | Michael R. Landa | Dennis L Betz, Jr. |
| 3M Center Bldg. 230-BS-20 | P.O. Box 1117 | 228 South Main Street |
| St. Paul, MN 55144-1000 | Chads Ford, PA 19317-0658 | Spring Grove, PA 17362-1000 |
| (612) 736-5502 | (610) 793-3801 | (717) 225-6834 |
| Brown-Bridge Industries, Inc. | Kanzaki Specialty Papers | Paper Corp. of United States |
| Charles W. Newing | Mitch Araki | John J. Mulkern |
| 518 East Water Street | 20 Cummings Street | 161 Avenue of the Americas |
| Troy, OH 45373-0370 | P.O. Box 2002 | New York, NY 10013-1205 |
| (513) 332-6321 | Ware, MA 01082-2002 | (212) 337-5519 |
| | (413) 967-6204 | |
| Coated Papers Limited | Nichemen America Inc. | Westvaco |
| Arthur Lashford | Ms. Barbara Posmyk | Donald F. Hilke, Jr. |
| Bollington, Macclesfield | 1185 Avenue of the | 1011 Boulder Springs Drive |
| Cheshire, SK 10 5QF UK | Americas | Richmond, VA 23225-4950 |
| 0625 573051 | New York, NY 10036-2601 | (804) 327-6546 |
| | (212) 719-1000 | |

What is claimed is:

1. A self-adhesive postage stamp, comprising:
   (a) a flexible face stock having opposed first and second faces, at least one of which is imprinted with postage indicia; and
   (b) a pressure-sensitive adhesive applied to one face of the flexible face stock, said pressure-sensitive adhesive comprising an acrylic copolymer made from a mixture of monomers, comprising, based on the total weight of monomers,
      (i) from about 9 to about 40% of an ethylenically unsaturated monomer having an isobornyl group, and
      (ii) from about 50 to about 91% of at least one alkyl acrylate having an alkyl group with about 4 to about 8 carbon atoms.

2. A self-adhesive postage stamp as recited in claim 1, wherein the monomer having an isobornyl group is isobornyl acrylate.

3. A self-adhesive postage stamp as recited in claim 1, wherein the isobornyl acrylate is present in an amount of from about 20 to about 30% by weight, based on the total weight of monomers.

4. A self-adhesive postage stamp as recited in claim 1, wherein the mixture of monomers further comprises up to about 20% by weight of 1 or more additional monomers selected from the group consisting of polar monomers, short chain alkyl acrylates and methyl methacrylates having alkyl groups with up to 3 carbon atoms, and monohydric alkyl acrylates and methacrylates having alkyl groups with about 2 to about 8 carbon atoms.

5. A self-adhesive postage stamp as recited in claim 1, wherein the acrylic copolymer is an emulsion polymer.

6. A self-adhesive postage stamp as recited in claim 1, wherein the acrylic copolymer is a bulk polymer.

7. A self-adhesive postage stamp as recited in claim 1, wherein the acrylic copolymer is applied as a hot melt.

8. A self-adhesive postage stamp as recited in claim 1, wherein the acrylic copolymer is applied as a solvent-borne coating.

9. A self-adhesive postage stamp as recited in claim 1, wherein the flexible face stock is selected from the group consisting of paper and polymeric face stocks.

10. A self-adhesive postage stamp as recited in claim 1, wherein the flexible face stock meets United States Postal Service facestock requirements classified as "required" in USPS-P-1238C.

11. A self-adhesive postage stamp as recited in claim 1, wherein the flexible face stock meets the United States Postal Service facestock requirements classified as "target" in USPS-P-1238C.

12. A self-adhesive postage stamp as recited in claim 1, further comprising a removable release liner protecting the pressure-sensitive adhesive.

13. A self-adhesive postage stamp, comprising:
   (a) a flexible face stock having opposed first and second faces, at least one of which is imprinted with postage indicia; and
   (b) a pressure-sensitive adhesive applied to one face of the flexible face stock, said pressure-sensitive adhesive comprising an acrylic copolymer made from a mixture of monomers comprising, based on the total weight of monomers,
      (i) from about 20 to about 30% isobornyl acrylate,
      (ii) about 50 to about 80% of one or more alkyl acrylates having alkyl groups with about 4 to about 8 atoms,
      (iii) about 1 to about 20% methyl methacrylate,
      (iv) about 1 to about 6% acrylic acid, and
      (v) about 0.5 to about 6% hydroxyethyl acrylate.

14. A self-adhesive postage stamp as recited in claim 13 wherein the flexible face stock meets the United States Postal Service facestock requirements classified as "required" in USPS-P-1238C.

15. A self-adhesive postage stamp as recited in claim 13, further comprising a release liner.

16. A self-adhesive postage stamp as recited in claim 1, wherein the stamp exhibits more than a slight fiber pick when removed from an envelope after a dwell time of at least about five minutes.

* * * * *